| (12) | United States Patent | (10) Patent No.: | US 11,912,858 B2 |
|---|---|---|---|
| | Araki et al. | (45) Date of Patent: | Feb. 27, 2024 |

(54) MOLDED BALE OF RUBBER-LIKE BLOCK COPOLYMER, RUBBER COMPOSITION, CROSSLINKING RUBBER COMPOSITION, AND TREAD FOR TIRE

(71) Applicant: Asahi Kasei Kabushiki Kaisha, Tokyo (JP)

(72) Inventors: Yoshifumi Araki, Tokyo (JP); Atsushi Yasumoto, Tokyo (JP); Daigo Matsuoka, Tokyo (JP); Yoshihisa Inoue, Tokyo (JP); Tomohiro Kondo, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 311 days.

(21) Appl. No.: 17/366,226

(22) Filed: Jul. 2, 2021

(65) Prior Publication Data

US 2022/0002535 A1 Jan. 6, 2022

(30) Foreign Application Priority Data

Jul. 3, 2020 (JP) .................................. 2020-115843

(51) Int. Cl.
*C08L 53/02* (2006.01)
*C08L 9/00* (2006.01)
*C08L 23/16* (2006.01)
*C08K 3/36* (2006.01)
*B60C 1/00* (2006.01)

(52) U.S. Cl.
CPC .......... *C08L 53/025* (2013.01); *B60C 1/0016* (2013.01); *C08K 3/36* (2013.01); *C08L 9/00* (2013.01); *C08L 23/16* (2013.01); *C08L 2205/035* (2013.01)

(58) Field of Classification Search
CPC . C08L 53/02; C08L 9/00; C08L 23/16; C08K 3/36; B60C 1/00
USPC ......................................................... 524/505
See application file for complete search history.

(56) References Cited

U.S. PATENT DOCUMENTS 6,300,416 B1 * 10/2001 Okada .................... C08L 23/16
    525/240
2005/0107521 A1   5/2005 Sasagawa et al.
2008/0200602 A1   8/2008 Tadaki et al.
2020/0239675 A1   7/2020 Tardif et al.

FOREIGN PATENT DOCUMENTS

| JP | H04-255734 A | 9/1992 |
|---|---|---|
| JP | 2005-126485 A | 5/2005 |
| JP | 2006-152277 A | 6/2006 |
| JP | 2008-231208 A | 10/2008 |
| JP | 2010-270314 A | 12/2010 |
| JP | 2019-199525 A | 11/2019 |
| JP | 2020-143241 A | 9/2020 |
| WO | 2019/078083 A1 | 4/2019 |
| WO | 2019/151126 A1 | 8/2019 |
| WO | 2019/151127 A1 | 8/2019 |

\* cited by examiner

*Primary Examiner* — Deve V Hall

(74) *Attorney, Agent, or Firm* — Morgan, Lewis & Bockius LLP

(57) ABSTRACT

A molded bale of a rubber-like block copolymer, the rubber-like block copolymer containing 5% by mass or more and 95% by mass or less of a polymer block (a) having a content of a vinyl aromatic monomer unit of 22% by mass or less; and 5% by mass or more and 95% by mass or less of a polymer block (b) having a content of a vinyl aromatic monomer unit of 23% by mass or more and less than 50% by mass, in which the rubber-like block copolymer has an iodine value of 10 to 250, an ethylene structure content of 3% by mass or more, and a vinyl aromatic monomer block content of less than 10% by mass.

20 Claims, No Drawings

MOLDED BALE OF RUBBER-LIKE BLOCK COPOLYMER, RUBBER COMPOSITION, CROSSLINKING RUBBER COMPOSITION, AND TREAD FOR TIRE

BACKGROUND OF THE INVENTION

Field of the Invention

The present invention relates to a molded bale of a rubber-like block copolymer, a rubber composition, a crosslinking rubber composition, and a tread for a tire.

Description of the Related Art

In recent years, in the fields of rubber materials for various applications such as tire treads, sheets, films, and materials for asphalt modification, a rubber composition containing a rubber-like polymer having an ethylene structure and containing a crosslinkable unsaturated group introduced therein has been proposed for purposes of increasing mechanical strength and permanent compression set (see, for example, International Publication Nos. WO2019/151126, WO2019/151127, and WO2019/078083).

The conventionally proposed rubber composition containing a rubber-like polymer having an ethylene structure and containing a crosslinkable unsaturated group introduced therein has, however, problems that tensile elongation and abrasion resistance of the rubber composition are low, and that fatigue of a user tends to be intense in real vehicle driving evaluation for a tire using the rubber composition.

Therefore, an object of the present invention is to provide a molded bale of a rubber-like block copolymer that has excellent tensile elongation and tensile strength and has high abrasion resistance when formed into a rubber composition, and is difficult to make fatigue of a user intense in real vehicle driving evaluation for a tire using the rubber composition.

SUMMARY OF THE INVENTION

The present inventors made earnest studies to solve the above-described problems of the conventional techniques, resulting in finding the following: When a rubber-like block copolymer having a specific structure is formed into a rubber composition, tensile strength and abrasion resistance are difficult to lower, and fatigue is difficult to be intense in real vehicle driving evaluation for a tire using the rubber composition. Thus, the present invention was accomplished.

Specifically, the present invention provides the following:

[1] A molded bale of a rubber-like block copolymer, the rubber-like block copolymer comprising:

5% by mass or more and 95% by mass or less of a polymer block (a) having a content of a vinyl aromatic monomer unit of 22% by mass or less; and 5% by mass or more and 95% by mass or less of a polymer block (b) having a content of a vinyl aromatic monomer unit of 23% by mass or more and less than 50% by mass, wherein the rubber-like block copolymer has an iodine value of 10 to 250, an ethylene structure content of 3% by mass or more, and a vinyl aromatic monomer block content of less than 10% by mass.

[2] The molded bale of the rubber-like block copolymer according to [1], wherein an α-olefin content in a monomer unit excluding the vinyl aromatic monomer unit in the polymer block (b) is 17% by mass or more.

[3] The molded bale of the rubber-like block copolymer according to [1] or [2], wherein the content of the vinyl aromatic monomer unit in the polymer block (b) is less than 40% by mass.

[4] The molded bale of the rubber-like block copolymer according to any one of [1] to [3], wherein an SP value ($MPa^{1/2}$) of the polymer block (a) is 16.4 or more and 18.5 or less.

[5] The molded bale of the rubber-like block copolymer according to any one of [1] to [4], wherein the rubber-like block copolymer constituting the molded bale has a weight average molecular weight of 100,000 or more.

[6] The molded bale of the rubber-like block copolymer according to any one of [1] to [5], wherein the rubber-like block copolymer constituting the molded bale contains 5% by mass or more of the vinyl aromatic monomer unit.

[7] The molded bale of the rubber-like block copolymer according to any one of [1] to [6], wherein the rubber-like block copolymer constituting the molded bale contains a nitrogen atom.

[8] The molded bale of the rubber-like block copolymer according to any one of [1] to [7], wherein the rubber-like block copolymer constituting the molded bale has a modification ratio, measured by column adsorption GPC, of 40% by mass or more.

[9] A rubber composition, comprising:

the rubber-like block copolymer constituting the molded bale according to any one of [1] to [8]; and at least any one selected from the group consisting of the following (1) to (4):

(1) a rubber-like copolymer that has a random structure containing a vinyl aromatic monomer unit, and has an iodine value of 10 to 250, an ethylene structure content of 3% by mass or more, and a vinyl aromatic monomer block content of less than 10% by mass;

(2) a copolymer that has a random block containing a vinyl aromatic monomer unit, and a conjugated diene monomer block or an olefin block, and has an iodine value of 10 to 250, an ethylene structure content of 3% by mass or more, and a vinyl aromatic monomer block content of less than 10% by mass;

(3) a hydrogenated product of a conjugated diene homopolymer having an iodine value of 10 to 250, and an ethylene structure content of 3% by mass or more; and (4) a copolymer of conjugated diene and olefin having an iodine value of 10 to 250, and an ethylene structure content of 3% by mass or more.

[10] A rubber composition, comprising:

a first polymer corresponding to the rubber-like block copolymer constituting the molded bale according to any one of [1] to [8]; and a second polymer corresponding to the rubber-like block copolymer constituting the molded bale according to any one of [1] to [8] that is different from the first polymer in at least one content selected from the group consisting of a content of the polymer block (a) or (b) in the rubber-like block copolymer, a content of the vinyl aromatic monomer unit in the polymer block (a) or (b), an ethylene content, a conjugated diene monomer unit content, and an α-olefin content.

[11] A rubber composition, comprising:
the rubber-like block copolymer constituting the molded bale according to any one of [1] to [8]; and
at least one selected from the group consisting of natural rubber, polyisoprene, polybutadiene, and ethylene-propylene-diene rubber.
[12] A rubber composition, comprising:
the rubber-like block copolymer constituting the molded bale according to any one of [1] to [8]; and
a resin,
wherein the resin is contained in a content of 3 to 40 parts by mass based on 100 parts by mass of a rubber component.
[13] A rubber composition, comprising:
the rubber-like block copolymer constituting the molded bale according to any one of [1] to [8]; and
silica,
wherein the silica is contained in a content of 20 parts by mass or more and 120 parts by mass or less based on 100 parts by mass of a rubber component.
[14] A crosslinking rubber composition, comprising:
the rubber-like block copolymer constituting the molded bale according to any one of [1] to [8]; and
a crosslinking agent,
wherein the crosslinking agent is contained in a content of 0.1 parts by mass or more and 20 parts by mass or less based on 100 parts by mass of a rubber component.
[15] A molded bale of the rubber composition according to any one of [9] to [13], or the crosslinking rubber composition according to [14].
[16] A tread for a tire, comprising the rubber composition according to any one of [9] to [13], or the crosslinking rubber composition according to [14].

According to the present invention, a molded bale of a rubber-like block copolymer that has excellent tensile elongation and tensile strength and has high abrasion resistance when formed into a rubber composition, and is difficult to make fatigue of a user intense in real vehicle driving evaluation for a tire using the rubber composition, and a rubber composition containing the rubber-like block copolymer are obtained.

DETAILED DESCRIPTION OF THE PREFERRED EMBODIMENT

Now, an embodiment for practicing the present invention (hereinafter referred to as the "present embodiment") will be described in detail.

It is noted that the following embodiment is merely illustrative for describing the present invention, and that the present invention is not limited to the following embodiment. The present invention can be practiced with modifications appropriately made within the scope thereof.

[Molded Bale of Rubber-Like Block Copolymer]

A molded bale of a rubber-like block copolymer of the present embodiment is a molded bale of a rubber-like block copolymer containing: 5% by mass or more and 95% by mass or less of a polymer block (a) having a content of a vinyl aromatic monomer unit of 22% by mass or less; and 5% by mass or more and 95% by mass or less of a polymer block (b) having a content of a vinyl aromatic monomer unit of 23% by mass or more and less than 50% by mass, in which the rubber-like block copolymer has an iodine value of 10 to 250, an ethylene structure content of 3% by mass or more, and a vinyl aromatic monomer block content of less than 10% by mass.

Owing to this configuration, a molded bale of a rubber-like block copolymer that has excellent tensile elongation and tensile strength and has high abrasion resistance when formed into a rubber composition, and is difficult to make fatigue of a user intense in real vehicle driving evaluation for a tire using the rubber composition is obtained.

(Rubber-Like Block Copolymer)

The rubber-like block copolymer constituting the molded bale of the present embodiment (hereinafter referred to as the rubber-like block copolymer of the present embodiment) contains 5% by mass or more and 95% by mass or less of the polymer block (a) having a content of a vinyl aromatic monomer unit of 22% by mass or less, and 5% by mass or more and 95% by mass or less of the polymer block (b) having a content of a vinyl aromatic monomer unit of 23% by mass or more and less than 50% by mass, and has an iodine value of 10 to 250, an ethylene structure content of 3% by mass or more, and a vinyl aromatic monomer block content of less than 10% by mass.

<Iodine Value>

The iodine value of the rubber-like block copolymer of the present embodiment is 10 to 250.

The iodine value is 10 or more, preferably 15 or more, more preferably 30 or more, and further preferably 50 or more from the viewpoints of crosslinkability obtained in using the rubber-like block copolymer of the present embodiment as a rubber component of a crosslinking rubber composition, and flexibility obtained in use in a material of a tire. On the other hand, from the viewpoints of mechanical strength and abrasion resistance obtained in use in a material of a tire, the iodine value is 250 or less, preferably 200 or less, more preferably 150 or less, further preferably 100 or less, and still further preferably 70 or less.

The iodine value can be measured in accordance with a method described in "JIS K 0070: 1992".

The iodine value is a value, in terms of the weight in grams of iodine, corresponding to an amount of halogen reacting with 100 g of a target substance, and hence the iodine value is expressed in the unit of "g/100 g".

Since a conjugated diene monomer has a double bond, for example, if a conjugated diene monomer and a vinyl aromatic monomer are copolymerized in a production method for the rubber-like block copolymer described below, the iodine value of the rubber-like block copolymer is lower when a content of a conjugated diene monomer unit is lower. Alternatively, if a conjugated diene monomer unit is hydrogenated in the production method, the iodine value is lower as a hydrogenation rate is higher.

The iodine value of the rubber-like block copolymer can be controlled to fall in the above-described numerical range by adjusting an amount of a conjugated diene monomer added, a hydrogenation amount in hydrogenation process, and the like.

<Ethylene Structure Content>

The rubber-like block copolymer of the present embodiment has an ethylene structure content of 3% by mass or more (ethylene structure content≥3% by mass).

When the ethylene structure content is 3% by mass or more, tensile strength of a rubber composition using the rubber-like block copolymer of the present invention is difficult to lower. The ethylene structure content is preferably 5% by mass or more, more preferably 20% by mass or more, and further preferably 40% by mass or more.

The ethylene structure content is preferably 90% by mass or less, more preferably 80% by mass or less, further preferably 70% by mass or less, and still further preferably 60% by mass or less.

When the ethylene structure content is 90% by mass or less, excellent rubber elasticity is obtained.

The ethylene structure in the rubber-like block copolymer encompasses all ethylene structures such as an ethylene structure obtained by copolymerizing an ethylene monomer, and an ethylene structure obtained by polymerizing a conjugated diene monomer and then hydrogenating the resultant. For example, when a 1,4-butadiene unit is hydrogenated, two ethylene structures are obtained, and when a 1,4-isoprene unit is hydrogenated, one propylene structure and one ethylene structure are obtained.

The ethylene structure content in the rubber-like block copolymer can be measured by a method described in examples below, and can be controlled to fall in the above-described numerical range by adjusting an amount of ethylene added, an amount of a conjugated diene monomer added, a hydrogenation rate, and the like.

<Vinyl Aromatic Monomer Block Content>

The rubber-like block copolymer of the present embodiment has a vinyl aromatic monomer block content of less than 10% by mass (vinyl aromatic monomer block<10% by mass).

A vinyl aromatic monomer block refers to a block including a chain of eight or more vinyl aromatic monomer units.

When the vinyl aromatic monomer block content is less than 10% by mass, fuel economy obtained when the rubber-like block copolymer of the present embodiment is used as a raw material of a tire tends to be improved. The aromatic vinyl monomer block content is preferably 7% by mass or less, more preferably 5% by mass or less, and further preferably 3% by mass or less.

Regarding the vinyl aromatic monomer block, from the viewpoint of flexibility, the number of blocks each including a chain of 30 or more vinyl aromatic monomer units is preferably few or zero. Specifically, when the copolymer is a butadiene-styrene copolymer, the form of the vinyl aromatic monomer block can be verified by decomposing the polymer by a method of Kolthoff (method described in I. M. Kolthoff et al., J. Polym. Sci. 1, 429 (1946)), and measuring an amount of polystyrene insoluble in methanol. As another method, any of known methods such as one in which a chain of styrene units is measured by NMR as described in International Publication No. WO2014/133097 can be employed for the measurement.

The vinyl aromatic monomer block content in the rubber-like block copolymer of the present embodiment can be controlled to fall in the above-described numerical range by adjusting a method for adding a vinyl aromatic monomer, an amount of a polymerization aid added, a polymerization temperature, and the like.

<Tan δ Peak by Viscoelasticity Measurement>

In viscoelasticity measurement of the rubber-like block copolymer of the present embodiment, it is preferable that a tan δ peak having a tan δ peak height of 0.1 or more is not present in a range of 25° C. or more and 110° C. or less from the viewpoints of manufacturability, processability and compatibility of a rubber composition using the rubber-like block copolymer, and fuel economy obtained in use as a raw material of a tire. It is more preferable that such a tan δ peak is not present in a range of 10° C. or more and 110° C. or less, further preferable that such a tan δ peak is not present in a range of 0° C. or more and 110° C. or less, and still further preferable that such a tan δ peak is not present in a range of −10° C. or more and 110° C. or less.

A viscoelasticity can be measured with a viscoelasticity tester "ARES" manufactured by Rheometric Scientific in a twist mode at 10 Hz and a strain in the range of 0.1 to 1%.

The tan δ peak obtained by the viscoelasticity measurement of the rubber-like block copolymer of the present embodiment can be controlled to fall in the above-described temperature range by adjusting the content of an aromatic vinyl monomer unit, a polymerization temperature, and the type or amount of a polar compound (vinylating agent) or the like added in polymerization.

<Conjugated Diene Monomer Unit>

The rubber-like block copolymer of the present embodiment contains a conjugated diene monomer unit preferably in a content of 2% by mass or more from the viewpoints of crosslinkability and flexibility of a crosslinking rubber composition using the rubber-like block copolymer of the present embodiment.

A conjugated diene monomer unit contained as a component of the rubber-like block copolymer has a double bond, and hence becomes a crosslinkable unsaturated group.

The content of the conjugated diene monomer unit in the rubber-like block copolymer is closely related to the iodine value described above.

When the content of the conjugated diene monomer unit is 2% by mass or more, tensile strength of a rubber composition using the rubber-like block copolymer of the present embodiment is difficult to lower. The content of the conjugated diene monomer unit is more preferably 3% by mass or more, and further preferably 6% by mass or more. The content of the conjugated diene monomer unit is preferably 50% by mass or less, more preferably 30% by mass or less, and further preferably 20% by mass or less. When the content of the conjugated diene monomer unit is 50% by mass or less, weather resistance and resistance to degradation over time are excellent.

The content of the conjugated diene monomer unit in the rubber-like block copolymer of the present embodiment can be measured by a method described in the examples below, and can be controlled to fall in the above-described numerical range by adjusting an amount of a used monomer, and the type or amount of a hydrogenation catalyst used in a hydrogenation reaction described below.

<Polymer Blocks (a) and (b) contained in Rubber-like Block Copolymer>

The rubber-like block copolymer of the present embodiment contains 5% by mass or more and 95% by mass or less of the polymer block (a) having a content of a vinyl aromatic monomer unit of 22% by mass or less, and 5% by mass or more and 95% by mass or less of the polymer block (b) having a content of a vinyl aromatic monomer unit of 23% by mass or more and less than 50% by mass from the viewpoints that tensile strength and abrasion resistance are difficult to lower, that fatigue of a user is difficult to be intense in real vehicle driving evaluation for a tire using the rubber-like block copolymer as a material of a rubber composition, and that good property balance can be obtained.

The reason why tensile strength and abrasion resistance are difficult to lower, fatigue of a user is difficult to be intense in real vehicle driving evaluation for a tire using a rubber composition containing the rubber-like block copolymer of the present embodiment, and good property balance can be obtained when the rubber-like block copolymer of the present embodiment contains these two different polymer blocks (a) and (b) is probably due to change of compatibility caused by two different block structures, change of viscoelasticity caused by two different glass transition temperatures, change of crosslinkability caused by two different unsaturated group contents, and the like.

The content of a vinyl aromatic monomer unit in the polymer block (a) contained in the rubber-like block copolymer of the present embodiment is preferably 5% by mass or more, more preferably 7% by mass or more, and further preferably 9% by mass or more from the viewpoints that tensile strength and abrasion resistance are difficult to lower, that fatigue of a user is difficult to be intense in real vehicle driving evaluation for a tire using the rubber-like block copolymer of the present embodiment as a material of a rubber composition, and thus good property balance can be obtained, and that the rubber composition attains excellent mechanical strength (hereinafter, all together sometimes referred to as the balance among three properties).

On the other hand, not only from the viewpoint of the balance among three properties but also from the viewpoint of fuel economy of a tire, the content of a vinyl aromatic monomer unit in the polymer block (a) is 22% by mass or less, preferably 20% by mass or less, and more preferably 18% by mass or less.

The content of a vinyl aromatic monomer unit in the polymer block (a) can be controlled to fall in the above-described numerical range by adjusting an amount of a monomer added in polymerization process.

The content of a vinyl aromatic monomer unit in the polymer block (b) is 23% by mass or more, preferably 28% by mass or more, and more preferably 33% by mass or more not only from the viewpoint of the balance among three properties but also from the viewpoint of wet skid resistance of a tire. On the other hand, not only from the viewpoint of the balance among three properties but also from the viewpoint of flexibility of a rubber composition, the content is 50% by mass or less, preferably 45% by mass or less, more preferably 42% by mass or less, further preferably less than 40% by mass, and still further preferably 38% by mass or less.

The content of a vinyl aromatic monomer unit in the polymer block (b) can be controlled to fall in the above-described numerical range by adjusting an amount of a monomer added in polymerization process.

In the rubber-like block copolymer of the present embodiment, the polymer block (a) has a comparatively low glass transition temperature (Tg), the polymer block (b) has an intermediate Tg, and thus, portions having different Tgs are simultaneously present in one rubber-like block copolymer. It is probably owing to this configuration that the effect of inhibiting lowering of tensile strength and abrasion resistance can be exhibited.

<Contents of Polymer Blocks (a) and (b)>

The content of the polymer block (a) in the rubber-like block copolymer of the present embodiment is 5% by mass or more, preferably 10% by mass or more, more preferably 20% by mass or more, further preferably 30% by mass or more, and still further preferably 40% by mass or more not only from the viewpoint of the balance among three properties but also from the viewpoints of fuel economy and flexibility at a low temperature of a tire. On the other hand, from the viewpoints of wet skid resistance and high rigidity of a tire, the content is 95% by mass or less, preferably 85% by mass or less, more preferably 75% by mass or less, further preferably 65% by mass or less, and still further preferably 45% by mass or less.

The content of the polymer block (b) in the rubber-like block copolymer of the present embodiment is 5% by mass or more, preferably 10% by mass or more, more preferably 20% by mass or more, further preferably 30% by mass or more not only from the viewpoint of the balance among three properties but also from the viewpoints of wet skid resistance and high rigidity of a tire. On the other hand, from the viewpoints of fuel economy and flexibility at a low temperature of a tire, the content is 95% by mass or less, preferably 85% by mass or less, more preferably 75% by mass or less, further preferably 65% by mass or less, and still further preferably 45% by mass or less.

<$\alpha$-Olefin Content in all Monomer Units Excluding Vinyl Aromatic Monomer Unit in Polymer Blocks (a) and (b)>

In the rubber-like block copolymer of the present embodiment, an $\alpha$-olefin content in all monomer units excluding the vinyl aromatic monomer unit in the polymer block (a) is preferably 13% by mass or more, more preferably 20% by mass or more, and further preferably 30% by mass or more from the viewpoints of productivity of the rubber-like block copolymer, and compatibility of a rubber composition using the rubber-like block copolymer. On the other hand, from the viewpoint of mechanical strength obtained in use in a tire, the content is preferably 70% by mass or less, more preferably 60% by mass or less, further preferably 55% by mass or less, and still further preferably 50% by mass or less.

In the rubber-like block copolymer of the present embodiment, an $\alpha$-olefin content in all monomer units excluding the vinyl aromatic monomer unit in the polymer block (b) is preferably 17% by mass or more, more preferably 25% by mass or more, and further preferably 35% by mass or more from the viewpoints of productivity of the rubber-like block copolymer (which means that productivity is difficult to be improved because production is not stable when a vinyl bond content is too low), compatibility with another rubber if a rubber composition using the rubber-like block copolymer is used together with another rubber, or compatibility with a crosslinking agent or a filler if another rubber is not used, and high wet skid resistance obtained in the form of a tire. On the other hand, from the viewpoint of mechanical strength obtained in use in a tire, the content is preferably 65% by mass or less, more preferably 60% by mass or less, further preferably 58% by mass or less, and still further preferably 55% by mass or less.

As $\alpha$-olefin used in the polymer block (a) and the polymer block (b) in the rubber-like block copolymer of the present embodiment, butylene is preferred from the viewpoint of productivity.

<Ethylene Structure Content in all Monomer Units Excluding Vinyl Aromatic Monomer Unit in Polymer Blocks (a) and (b)>

An ethylene structure content in all monomer units excluding the vinyl aromatic monomer unit in the polymer block (a) contained in the rubber-like block copolymer of the present embodiment is in a range of preferably 15 to 75% by mass, more preferably 18 to 70% by mass, and further preferably 20 to 65% by mass from the viewpoints of compatibility and tensile strength of a rubber composition using the rubber-like block copolymer of the present embodiment.

An ethylene structure content in all monomer units excluding the vinyl aromatic monomer unit in the polymer block (b) contained in the rubber-like block copolymer of the present embodiment is in a range of preferably 10 to 75% by mass, more preferably 15 to 70% by mass, and further preferably 18 to 65% by mass similarly from the viewpoints of compatibility and tensile strength of a rubber composition using the rubber-like block copolymer of the present embodiment.

<Conjugated Diene Monomer Unit Content in all Monomer Units Excluding Vinyl Aromatic Monomer Unit in Polymer Blocks (a) and (b)>

A conjugated diene monomer unit content in all monomer units excluding the vinyl aromatic monomer unit in the polymer block (a) contained in the rubber-like block copolymer of the present embodiment is in a range of preferably 0.5 to 40% by mass, more preferably 1.0 to 35% by mass, and further preferably 1.5 to 30% by mass from the viewpoints of compatibility of a rubber composition using the rubber-like block copolymer of the present embodiment, and crosslinkability of a crosslinking rubber composition.

A conjugated diene monomer unit content in all monomer units excluding the vinyl aromatic monomer unit in the polymer block (b) contained in the rubber-like block copolymer of the present embodiment is in a range of preferably 0.5 to 35% by mass, more preferably 1.0 to 33% by mass, and further preferably 1.5 to 30% by mass similarly from the viewpoints of compatibility and tensile strength of a rubber composition using the rubber-like block copolymer of the present embodiment.

When the rubber-like block copolymer of the present embodiment is produced by polymerizing or copolymerizing a conjugated diene monomer, and then hydrogenating the resultant, in order to control the α-olefin content, the ethylene content, and the conjugated diene monomer unit content in the polymer block (a) and the polymer block (b) to respectively fall in the above-described prescribed ranges, a vinyl bond content in a conjugated diene monomer unit of a conjugated diene-based polymer before hydrogenation is preferably 18% by mol or more, more preferably 26% by mol or more, and further preferably 38% by mol. On the other hand, the vinyl bond content is preferably 75% by mol or less, more preferably 65% by mol or less, further preferably 62% by mol or less, and still further preferably 58% by mol or less.

In this manner, when the rubber-like block copolymer of the present embodiment is produced by hydrogenating a polymer or a copolymer of a conjugated diene monomer, the α-olefin content, the ethylene content, and the conjugated diene monomer unit content can be controlled by adjusting a content of a conjugated diene monomer unit before hydrogenation, a vinyl bond content, or a hydrogenation rate. It is noted that butylene is obtained by hydrogenating 1,2-vinylbutadiene, and thus, an α-olefin structure is obtained.

When the rubber-like block copolymer is produced by a method different from the method of polymerizing or copolymerizing a conjugated diene monomer and hydrogenating the resultant, for example, it can be produced by a method described in International Publication Nos. WO2019/078083, WO2019/111496, WO2019/142501, WO2019/171679, and WO2019/216100, although a block structure is not exemplified therein. In these methods, when coordination polymerization is employed for the production, the α-olefin content, the ethylene content, and the conjugated diene monomer unit content in the copolymer are controlled by adjusting amounts of α-olefin, ethylene, and a conjugated diene monomer added in the polymerization.

<SP Values of Polymer Blocks (a) and (b)>

The polymer block (a) contained in the rubber-like block copolymer of the present embodiment has an SP value ($MPa^{1/2}$) in a range of preferably 16.4 or more and 18.5 or less from the viewpoints of making tensile strength and abrasion resistance of a rubber composition using the rubber-like block copolymer of the present embodiment difficult to lower, making fatigue of a user difficult to be intense in real vehicle driving evaluation for a tire using the rubber composition, and obtaining good compatibility of the rubber composition.

The SP value ($MPa^{1/2}$) of the polymer block (a) is more preferably 16.8 or more, further preferably 17.0 or more, and still further preferably 17.2 or more from the viewpoint of wet skid resistance of a tire.

On the other hand, from the viewpoints of fuel economy and bending resistance of a tire, the SP value is more preferably 18.2 or less, further preferably 17.9 or less, and still further preferably 17.7 or less.

When the rubber composition using the rubber-like block copolymer of the present embodiment contains, as a rubber component, natural rubber or polyisoprene in an amount of 10% by mass or more, and preferably 20% by mass or more, the SP value of the polymer block (a) is preferably in a range of 17.1 to 17.3 from the viewpoint of compatibility of the rubber composition.

On the other hand, when the rubber composition using the rubber-like block copolymer of the present embodiment contains, as a rubber component, polybutadiene in an amount of 10% by mass or more, and preferably 20% by mass or more, the SP value of the polymer block (a) is preferably in a range of 17.6 to 17.8 from the viewpoint of compatibility of the rubber composition.

An SP value ($MPa^{1/2}$) of the polymer block (b) contained in the rubber-like block copolymer of the present embodiment is preferably 16.8 or more, more preferably 17.0 or more, and further preferably 17.2 or more from the viewpoints of rigidity of a rubber composition using the rubber-like block copolymer of the present embodiment and wet skid resistance obtained in the form of a tire. On the other hand, from the viewpoint of flexibility of the rubber composition, the SP value is preferably 18.6 or less, more preferably 18.2 or less, and further preferably 18.0 or less.

For calculating the SP values of the polymer blocks (a) and (b) constituting the rubber-like block copolymer of the present embodiment, a molar volume and cohesive energy of each vinyl polymer are calculated by a method of Bicerano (literature: J. Bicerano, Prediction of Polymer Properties, 3rd, Marcel Dekker, 2002).

As the cohesive energy, a value calculated in accordance with Van Krevelen method is used.

Next, an SP value of a copolymer having an arbitrary composition is obtained by a method described in formulas 17.8 to 17.10 on p. 615 of Jozef Bicerano: PREDICTION OF POLYMER PROPERTIES, Marcel Dekker, AMERICA (2002). It is noted that crystallinity and a microphase separated structure of a block copolymer or the like are not taken into account.

The cohesive energies E (J/mol)/molar volumes V ($10^{-6}$ $m^3$/mol) of, for example, the following vinyl polymers are as follows:

polystyrene: 36,932/97.0
1,2-polybutadiene: 16,450/58.3
1,4-polybutadiene: 18,579/59.1
1,2-polybutylene: 17,527/65.6
hydrogenated 1,4-polybutadiene: 18,146/64.4
1,4-polyisoprene: 22,644/76.6
1,2-polyisoprene: 19,407/75.3
3,4-polyisoprene: 20,908/82.2
polyethylene: 9,073/32.2

For example, an SP value of an equimolar copolymer of styrene/1,4-butadiene is calculated as follows.

$$E=36,932\times 0.5+18,579\times 0.5=27,755 \text{ (J/mol)}$$

$$V=97.0\times 0.5+59.1\times 0.5=78.1 \text{ (m}^3\text{/mol)}$$

$$\text{SP value}=(27,755/78.1)^{1/2}=18.6 \text{ ((J/cm}^3)^{1/2})$$

[Production Method for Rubber-Like Block Copolymer]

The rubber-like block copolymer of the present embodiment is produced preferably by anionic polymerization from the viewpoint of easy control of the block structure, and is produced preferably by hydrogenating some or most of double bonds of a polymer after polymerization process.

An unsaturated group contained in the rubber-like block copolymer of the present embodiment preferably contains a conjugated diene monomer unit or a myrcene. In other words, when some or most of double bonds of a polymer are hydrogenated by using a conjugated diene monomer or a myrcene after polymerization, it is preferable to contain a conjugated diene monomer unit or a myrcene left not hydrogenated for obtaining a prescribed iodine value among conjugated diene monomer units or myrcenes.

As a method for performing hydrogenation after anionic polymerization, as described in International Publication No. WO96/005250, Japanese Patent Laid-Open No. 2000-053706, and International Publication Nos. WO2003/085010, WO2019/151126, WO2019/151127, WO2002/002663, and WO2015/006179, a method in which a conjugated diene monomer is polymerized by anionic polymerization, or copolymerized with an additional monomer if necessary, with various additives under various conditions, and then the resultant is hydrogenated is preferably employed.

For example, when a block copolymer having a structure of $[(a-b)_k]-X$ among formulas described in <Block Structure of Rubber-like Block Copolymer> below is to be produced by batch polymerization process, for example, a method in which polymerization is performed with a monomer added to obtain a composition ratio of the polymer block (a), then polymerization is performed with a monomer added to obtain a composition ratio of the polymer block (b), a coupling agent (X) is subsequently added to perform a coupling reaction, and thereafter, the resultant is hydrogenated can be employed.

<Monomers>

The rubber-like block copolymer of the present embodiment can be produced by using a conjugated diene monomer, a vinyl aromatic monomer, and an additional monomer if necessary.

Examples of the conjugated diene monomer include, but are not limited to, 1,3-butadiene, isoprene, 2,3-dimethyl-1,3-butadiene, 1,3-pentadiene, 3-methyl-1,3-pentadiene, 1,3-hexadiene, and 1,3-heptadiene.

Among these, from the viewpoint of industrial availability, 1,3-butadiene and isoprene are preferred, and 1,3-butadiene is more preferred.

One of these may be singly used, or two or more of these may be used together.

Examples of the vinyl aromatic monomer include, but are not limited to, styrene, p-methylstyrene, α-methylstyrene, vinyl ethyl benzene, vinyl xylene, vinyl naphthalene, diphenylethylene, vinyl benzyl dimethylamine, (4-vinylbenzyl) dimethyl aminoethyl ether, N,N-dimethylaminoethyl styrene, N,N-dimethylaminomethyl styrene, and tertiary amino group-containing diphenylethylene (such as 1-(4-N,N-dimethylaminophenyl)-1-phenylethylene).

Among these, from the viewpoint of industrial availability, styrene is preferred.

One of these may be singly used, or two or more of these may be used together.

Examples of the additional monomer used if necessary include, but are not limited to, unsaturated carboxylic acid ester, unsaturated carboxylic acid, an α,β-unsaturated nitrile compound, α-olefin (such as propylene, butylene, pentene, or hexene), ethylene, myrcene, ethylidene norbornene, isopropylidene norbornene, cyclopentadiene, and divinylbenzene.

If the rubber-like block copolymer of the present embodiment is produced without performing hydrogenation after polymerization, a production method employing coordination polymerization described in, for example, International Publication Nos. WO2019/078083, WO2019/111496, WO2019/142501, WO2019/171679, or WO2019/216100 can be employed.

In such a method, a vinyl aromatic monomer, ethylene, α-olefin, a conjugated diene monomer, and an additional monomer to be added in polymerization are preferably the same as the types of the monomers exemplified above regarding the production by performing hydrogenation after polymerization.

The polymerization process and the hydrogenation process described above can be performed respectively by either a batch method or a continuous method.

[Structure and Physical Properties of Rubber-like Block Copolymer]

<Block Structure of Rubber-like Block Copolymer>

The block structure of the rubber-like block copolymer of the present embodiment is not especially limited, and preferable examples include those having structures represented by the following general formulas:

$(a-b)_n$;

$(b-a)_n$;

$b-(a-b)_{n+1}$;

$a-(b-a)_n$;

$a-(b-a)_n-X$;

$[(a-b)_k]_m-X$, $[(a-b)_k-a]_m-X$;

$[(b-a)_k]_m-X$; and $[(b-a)_k-b]_m-X$.

In these general formulas, a represents the polymer block (a), and b represents the polymer block (b).

Each of n and k represents an integer of 1 or more, and is preferably an integer of 1 to 5; m represents an integer of 2 or more, and is preferably an integer of 2 to 11; and X represents a residue of a coupling agent or a residue of a polyfunctional initiator.

When each of the polymer blocks (a) and (b) is present in a plural number, the plural polymer blocks may be the same or different in the structure such as a molecular weight or a composition.

A boundary between the blocks need not be always clearly distinguished.

If necessary, the rubber-like block copolymer may contain, in addition to the polymer blocks (a) and (b), a polymer block in a content of 40% by mass or less. From the viewpoint of balance among break strength, fuel economy, wet skid resistance and abrasion resistance obtained in use in a tire, however, the content of such a polymer block is preferably 30% by mass or less, more preferably 20% by mass or less, further preferably 10% by mass or less, and still further preferably 5% by mass or less.

When a coupling agent is added after polymerizing a monomer in production process of the rubber-like block copolymer of the present embodiment, in order to increase reactivity of the coupling agent, it is preferable to add, in addition to the polymer blocks (a) and (b), a coupling agent after a polymer block having a low content of a vinyl aromatic monomer unit of 15% by mass or less is polymerized. In other words, it is preferable to cause a coupling agent to react with an end of a block having a comparatively low content of a vinyl aromatic monomer unit, and a block having a high content of a monomer having a higher polymerization reactivity than a vinyl aromatic monomer.

Microstructures (such as distributions of a vinyl aromatic compound, a cis, trans, and vinyl structure in conjugated diene, an ethylene structure, a butylene structure, etc.) in each of the polymer block (a) and the polymer block (b) are not especially limited but these may be uniformly distributed, or distributed in a tapered manner, a stepwise manner, a convex manner, or a concave manner. Besides, a plurality of distribution forms may be simultaneously present.

When the rubber-like block copolymer of the present embodiment is obtained by hydrogenating some or most of double bonds in a polymer after the polymerization process, distributions of the hydrogenation rate among molecules and among polymer blocks are not especially limited, and the hydrogenation rate may be uniform, non-uniform, or distributed.

<Weight Average Molecular Weight of Rubber-like Block Copolymer>

A weight average molecular weight of the rubber-like block copolymer of the present embodiment is preferably 100,000 or more, more preferably 150,000 or more, further preferably 200,000 or more, and still further preferably 250,000 or more from the viewpoints of compatibility of a rubber composition using the rubber-like block copolymer of the present embodiment, and tensile elongation of a crosslinking rubber composition.

On the other hand, from the viewpoint of processability obtained in forming the rubber composition into a crosslinking rubber composition, the molecular weight is preferably 1,000,000 or less, more preferably 700,000 or less, further preferably 600,000 or less, and still further preferably 500,000 or less.

A molecular weight distribution (=weight average molecular weight/number average molecular weight) of the rubber-like block copolymer of the present embodiment is preferably 2.0 or less, more preferably 1.8 or less, and further preferably 1.6 or less from the viewpoints of compatibility of a rubber composition and fuel economy obtained in use in a tire. On the other hand, from the viewpoint of processability obtained when the rubber composition is formed into a crosslinking composition, the molecular weight distribution is preferably 1.05 or more, more preferably 1.2 or more, and further preferably 1.4 or more.

The weight average molecular weight and the molecular weight distribution can be calculated based on a molecular weight, in terms of polystyrene, measured by GPC (gel permeation chromatography).

The weight average molecular weight and the molecular weight distribution of the rubber-like block copolymer can be controlled to respectively fall in the above-described numerical ranges by adjusting various polymerization conditions in the polymerization process such as an amount of a monomer added, a polymerization time, a polymerization temperature, and a polymerization pressure.

<Mooney Viscosities of Rubber-Like Block Copolymer and Rubber Composition Using the Same>

Mooney viscosities of the rubber-like block copolymer of the present embodiment and a rubber composition using the same can be indexes including information of the rubber-like block copolymer, such as the molecular weight, the molecular weight distribution, a branch number, and a content of a softener.

The Mooney viscosity measured at 100° C. of the rubber-like block copolymer and the rubber composition is preferably 40 or more, more preferably 50 or more, and further preferably 55 or more from the viewpoints of abrasion resistance, steering stability and break strength obtained when a crosslinking rubber composition is used in a tire. On the other hand, from the viewpoints of productivity of the rubber-like block copolymer and the rubber composition, and processability obtained in producing the rubber composition with a filler and the like blended, the Mooney viscosity is preferably 180 or less, more preferably 150 or less, further preferably 130 or less, and still further preferably 110 or less.

As a measurement method for the Mooney viscosity, a method prescribed in ISO 289 can be applied.

<Content of Vinyl Aromatic Monomer Unit in Rubber-like Block Copolymer>

A content of the vinyl aromatic monomer unit in the rubber-like block copolymer of the present embodiment is preferably 5% by mass or more, more preferably 10% by mass or more, further preferably 15% by mass or more, and still further preferably 20% by mass or more from the viewpoints of resistance to deformation in transport of a molded article, and break strength and wet skid resistance obtained in use in a tire tread.

On the other hand, from the viewpoints of cuttability in measuring a sheet-shaped or block-shaped molded article, difficulty of rubber aggregation occurring in solvent removal process to ease adjustment to a prescribed metal amount in a rubber composition, and fuel economy and abrasion resistance obtained in use in a tire tread, the content is preferably 45% by mass or less, more preferably 30% by mass or less, and further preferably 25% by mass or less.

When a high modulus is required as in a run flat tire member or the like, the content is preferably 30% by mass or more.

The content of the vinyl aromatic monomer unit in the rubber-like block copolymer of the present embodiment can be controlled to fall in the above-described numerical range by adjusting an amount of a vinyl aromatic monomer added in appropriation process.

<Containing of Nitrogen Atom>

The rubber-like block copolymer of the present embodiment preferably contains a nitrogen atom from the viewpoints of peeling resistance of a rubber composition using the rubber-like block copolymer of the present embodiment from a molded article, and fuel economy obtained in the form of a tire.

A nitrogen atom can be contained in the rubber-like block copolymer by, for example, using a coupling agent containing a nitrogen atom in the production process of the rubber-like block copolymer.

<Modification Ratio>

The rubber-like block copolymer of the present embodiment preferably contains a tin atom or a nitrogen atom, and more preferably contains a nitrogen atom from the viewpoint of fuel economy obtained in the form of a tire.

The rubber-like block copolymer of the present embodiment has a modification ratio, measured by column adsorption GPC, of preferably 40% by mass or more, more preferably 60% by mass or more, and further preferably 70% by mass or more from the viewpoint of dispersibility of silica obtained in producing a tire using silica.

Herein, the term "modification ratio" refers to a mass ratio of a polymer having a nitrogen atom-containing functional group to the total amount of the rubber-like block copolymer.

A position where a nitrogen atom is introduced in the rubber-like block copolymer of the present embodiment may be any one of a polymerization starting end, a molecular chain (including a graft product), and a polymerization end.

The modification ratio can be controlled to fall in the above-described numerical range by adjusting a polymerization temperature, or an amount of a modifier added in modification process performed in the polymerization.

When the rubber-like block copolymer of the present embodiment is produced by hydrogenation after performing polymerization, from the viewpoints of polymerization productivity, a high modification ratio, and abrasion resistance and fuel economy obtained in the form of a tire, it is preferable to employ a method in which a nitrogen atom or a tin atom is introduced with a coupling agent containing a tin atom or a nitrogen atom. It is more preferable to employ a method in which a nitrogen atom is introduced with a coupling agent containing a nitrogen atom.

As a coupling agent containing a nitrogen atom, from the viewpoints of polymerization productivity and a high modification ratio, an isocyanate compound, an isothiocyanate compound, an isocyanuric acid derivative, a nitrogen group-containing carbonyl compound, a nitrogen group-containing vinyl compound, a nitrogen group-containing epoxy compound, a nitrogen group-containing alkoxysilane compound and the like are preferred.

Among these coupling agents containing a nitrogen atom, from the viewpoints of polymerization productivity of the rubber-like block copolymer, a high modification ratio, and tensile strength obtained in the form of a tire, a nitrogen group-containing alkoxysilane compound is more preferred.

Examples of the nitrogen group-containing alkoxysilane compound include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, 2-ethoxy-2-ethyl-1-(3-diethoxyethylsilylpropyl)-1-aza-2-silacyclopentane, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, tris(4-trimethoxysilylbutyl)amine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-bis(3-(trimethoxysilyl)propyl)amino)propyl)-$N^1$-methyl-$N^3$-(3-(methyl(3-(trimethoxysilyl)propyl)amino)propyl)-$N^3$-(3-(trimethoxysilyl)propyl)-1,3-propanediamine.

<α-Olefin Content in all Monomer Units Excluding Vinyl Aromatic Monomer Unit in Rubber-Like Block Copolymer>

An α-olefin content in all monomer units excluding the vinyl aromatic monomer unit in the rubber-like block copolymer of the present embodiment is preferably 13% by mass or more, more preferably 15% by mass or more, and further preferably 25% by mass or more from the viewpoint of productivity of the rubber-like block copolymer.

On the other hand, from the viewpoint of heat aging resistance of the rubber-like block copolymer of the present embodiment, the content is preferably 65% by mass or less, more preferably 60% by mass or less, and further preferably 52% by mass or less.

The α-olefin content can be controlled in accordance with a vinyl bond content before hydrogenation reaction and a hydrogenation rate.

The α-olefin content can be measured by a method described in the examples below.

As described above, when the rubber-like block copolymer of the present embodiment is produced by hydrogenation after performing polymerization, a vinyl bond content in a conjugated diene monomer unit of a conjugated diene-based polymer before hydrogenation is preferably 13% by mol or more, more preferably 15% by mol or more, and further preferably 25% by mol. On the other hand, the vinyl bond content is preferably 65% by mol or less, more preferably 60% by mol or less, and further preferably 52% by mol or less.

[Process Following Polymerization Process of Rubber-like Block Copolymer]

In the production process of the rubber-like block copolymer of the present embodiment, it is preferable to add a deactivator, a neutralizer or the like after the polymerization process.

Examples of the deactivating agent include, but are not limited to, water; and alcohols such as methanol, ethanol, and isopropanol.

Examples of the neutralizer include, but are not limited to, carboxylic acids such as stearic acid, oleic acid, and versatic acid (a carboxylic acid mixture having 9 to 11 carbon atoms, mainly 10 carbon atoms, and having many branches); an aqueous solution of an inorganic acid, and carbon dioxide gas.

After the polymerization process, it is preferable to add a rubber stabilizer from the viewpoints of prevention of gel formation and processing stability.

As the rubber stabilizer, any of known stabilizers, not limited to the following, can be used, and antioxidants such as 2,6-di-tert-butyl-4-hydroxytoluene (hereinafter sometimes referred to as "BHT"), n-octadecyl-3-(4'-hydroxy-3', 5'-di-tert-butylphenol)propionate, and 2-methyl-4,6-bis[(octylthio)methyl]phenol are preferred as the rubber stabilizer.

<Addition of Rubber Softener>

The rubber-like block copolymer of the present embodiment can contain a rubber softener if necessary. A content of the rubber softener is preferably 30% by mass or less.

For improving productivity of the rubber-like block copolymer and processability obtained in blending an inorganic filler or the like in producing a tire, it is preferable to add, to the rubber-like block copolymer of the present embodiment, the rubber softener in a content of 1 to 30% by mass. If the rubber-like block copolymer has a high molecular weight, for example, if the weight average molecular weight exceeds 1,000,000, the rubber softener is contained in a content of preferably 15 to 30% by mass. On the other hand, if a filler is blended to obtain a rubber composition, the rubber softener is contained in a content of preferably 1 to 15% by mass for increasing the degree of blending freedom.

The content of the rubber softener in a rubber composition using the rubber-like block copolymer of the present embodiment is more preferably 20% by mass or less, further preferably 10% by mass or less, and still further preferably 5% by mass or less from the viewpoint of degradation over time caused in the form of a tire.

The rubber softener is not especially limited, and examples include an extender oil, a liquid rubber, and a resin.

From the viewpoints of processability, moldability, productivity, and economic efficiency, the rubber softener is preferably an extender oil.

As a method for adding the rubber softener, although not limited to the following, a method in which the rubber softener is added to be mixed with a polymer solution, and the thus obtained polymer solution containing the rubber softener is desolvated is preferably employed.

Preferable examples of the extender oil include, but are not limited to, an aromatic oil, a naphthenic oil, and a paraffin oil.

Among these, from the viewpoint of environmental safety, and from the viewpoints of oil bleed prevention and wet grip characteristics, an aroma substitute oil containing 3% by mass or less of a polycyclic aromatic (PCA) component in accordance with the IP 346 method is preferred. Examples of the aroma substitute oil include TDAE (Treated Distillate Aromatic Extracts) and MES (Mild Extraction Solvate) described in Kautschuk Gummi Kunststoffe 52 (12) 799 (1999), and RAE (Residual Aromatic Extracts).

<Addition of Additives>

To the rubber-like block copolymer of the present embodiment, various additives can be further added if necessary.

As such additives, a filler described below, or a tackifier can be added in process before molding. In this case, an amount of an additive to be blended is preferably 15% by mass or less.

<Addition of Additional Rubber Component>

The rubber-like block copolymer of the present embodiment may contain an additional rubber component if necessary.

As the additional rubber component, additional rubber components described as constituent components of a rubber composition and a crosslinking rubber composition described below are preferred.

<Process of Desolvation from Polymer Solution>

In the production method for the rubber-like block copolymer of the present embodiment, process of removing a solvent from the polymer solution is performed after the polymerization process.

An example of a method for removing a solvent includes a method using flushing, steam stripping, a drying conveyer after dehydration, a devolatilizing extruder, a drum dryer, or a devolatilizing kneader.

From the viewpoint that thermal history is small, a method using at least steam stripping is preferred.

As a steam stripping method and a method of a treatment performed before or after, methods described in Japanese Patent Laid-Open Nos. 10-168101 and 10-204136, International Publication No. WO2013/146530, Japanese Patent Laid-Open No. 2019-131810 and the like can be employed.

In the production method for a rubber-like block copolymer of the present embodiment, at a previous stage of performing an extruding/drying step, a desolvating step of removing a solvent from the polymer solution by steam stripping, and a screening step of taking out, from a slurry of the polymer, a water-containing crumb by separating from stripping water are preferably performed.

In a previous stage of the steam stripping, a flushing step may be performed for increasing the concentration of the solution.

When the desolvating step of removing a solvent from the polymer solution by steam stripping is performed at a previous stage of the extruding/drying step, a slurry of the polymer in which porous granular crumbs not containing the solvent but containing water are dispersed in hot water is obtained.

When the screening step of taking out, from the slurry of the polymer, the water-containing crumb by separating from stripping water is performed, a porous granular crumb containing water can be obtained.

Besides, a squeezing dehydration step of performing dehydration with a roll, a screw compression squeezer or the like is preferably performed before the extruding/drying step if necessary. Through such a dehydration step, a water-containing crumb in which a water content has been reduced can be obtained at the previous stage of the extruding/drying step.

Examples of a method for contacting the solution of the rubber-like block copolymer after polymerization with hot water or steam include a method in which a pressure for charging the solution is adjusted, a method in which a pressure, a temperature and an amount of steam are adjusted, a method in which a dispersant such as a phosphoric acid ester or a salt thereof like polyoxyalkylene alkyl ether phosphate, or a surfactant such as nonyl phenoxy polyethylene glycol phosphate or a salt thereof is added to steam, and a method in which the shape or the rotation speed of a rotor used in mixing is adjusted.

From the viewpoints of economic efficiency and removability of metal, it is preferable to contain an alcohol compound in the solution of the rubber-like block copolymer as a deactivating agent, and it is more preferable to precedently add, to the solution of the rubber-like block copolymer, a dispersant or a surfactant to be added in steam stripping.

[Amount of Residual Solvent and Water Content]

<Amount of Residual Solvent in Rubber-Like Block Copolymer or Molded Article of Rubber Composition>

An amount of the solvent remaining in the rubber-like block copolymer of the present embodiment, or a molded article of a rubber composition or a crosslinking rubber composition described below is preferably smaller from the viewpoints of an odor and VOC reduction. Specifically, the amount of the residual solvent is preferably 5,000 ppm or less, more preferably 3,000 ppm or less, and further preferably 1,500 ppm or less. From the viewpoint of balance of economic efficiency, the amount is preferably 50 ppm or more, more preferably 150 ppm or more, and further preferably 300 ppm or more.

<Water Content in Rubber-Like Block Copolymer or Molded Article of Rubber Composition>

A water content in the rubber-like block copolymer of the present embodiment or a molded article of a rubber composition is preferably 0.05% by mass or more and 1.5% by mass or less. The water content in the rubber-like block copolymer or the molded article of the rubber composition is preferably 0.05% by mass or more, more preferably 0.1% by mass or more, and further preferably 0.2% by mass or more from the viewpoint of inhibiting gelation in drying performed after desolvation. On the other hand, the water content is preferably 1.5% by mass or less, more preferably 1.0% by mass or less, and further preferably 0.8% by mass or less from the viewpoints of inhibition of condensation and discoloration resistance of the rubber composition using the rubber-like block copolymer of the present embodiment.

[Rubber Composition and Crosslinking Rubber Composition]

A rubber composition of the present embodiment contains the rubber-like block copolymer of the present embodiment described above, and a single one of or an appropriate combination of various polymers, resins, rubber components, fillers and the like.

A crosslinking rubber composition of the present embodiment contains the rubber-like block copolymer of the present embodiment described above, and a crosslinking agent, and contains the crosslinking agent in a content of 0.1 parts by mass or more and 20 parts by mass or less based on 100 parts by mass of a rubber component. It is noted that the rubber component embraces the rubber-like block copolymer of the present embodiment and the additional rubber component.

[Molded Bale]

A molded bale of the present embodiment is a molded bale of the rubber-like block copolymer, the rubber composition, or the crosslinking rubber composition. The molded bale of the present embodiment is preferably a molded article in the shape of a block (bale) of 1,000 cm$^3$ or more, and more preferably a rectangular parallelepiped bale of 15 kg to 35 kg.

The molded bale of the present embodiment can be molded by a method in which a crumb is compressed, or a method in which sheets are produced and stacked to be compressed, and a method in which crumbs having a specific surface area of 0.7 m$^2$/g to 3.2 m$^2$/g are produced, and the resultant crumbs are compression molded is preferred. From the viewpoint of moldability, it is preferable to further perform a step of sieving the crumbs before molding.

Since the crumbs are in close contact with one another in the compression molding of the crumbs in some cases, a specific surface area of the molded article is small as compared with the specific surface area of the crumbs. The close contact among the crumbs in the compression molding can be adjusted in accordance with the molecular weight, the composition and the structure of the rubber-like block copolymer, the composition of the rubber softener, and a temperature and a pressure employed in the compression. For example, if the specific surface area of the bale is to be reduced by increasing the close contact among the crumbs, it is preferable to employ, for example, a condition of reducing the molecular weight of the rubber-like block copolymer, increasing the amount of the rubber softener, or increasing the temperature and the pressure in the compression.

The specific surface area of the molded bale of the present embodiment is preferably 0.005 to 0.05 m$^2$/g, and more preferably 0.01 to 0.04 m$^2$/g from the viewpoint of a film packaging property. The specific surface area of the molded bale is preferably 0.005 m$^2$/g or more because expansion of the molded bale can be thus inhibited, and the specific surface area of the molded bale is preferably 0.05 m$^2$/g or less because the crumbs peeling off from the molded bale can be thus reduced.

The specific surface area of the molded bale can be obtained by a BET method.

In general, the specific surface area of a big molded bale tends to be varied depending on the position, and hence, a sample for the measurement is preferably obtained in a portion near the center of the molded bale.

The crumbs are preferably sieved into respective Particle sizes, before molding, to be mixed in an appropriate quantitative ratio.

If the specific surface area of the molded bale molded by directly using the crumbs resulting from the desolvation is over the upper limit of the above-described range, it is preferable to increase, among the sieved crumbs, a composition of crumbs having a large particle size and to reduce a composition of crumbs having a small particle size. If the specific surface area is smaller than the lower limit, it is preferable to reduce the composition of crumbs having a large particle size and to increase the composition of crumbs having a small particle size.

A compression pressure for molding the molded bale is preferably 3 to 30 MPa, and more preferably 10 to 20 MPa. When the compression pressure in the molding is 30 MPa or less, an apparatus to be used can be designed to be compact, and hence installation efficiency is high. When the compression pressure in the molding is 3 MPa or more, good moldability is obtained. When good moldability is obtained, there is a tendency that the surface of the molded bale is smooth, that the polymer is not peeled off in process following the molding, and that expansion otherwise caused after the molding is inhibited.

A temperature of the rubber-like block copolymer, the rubber composition and the crosslinking rubber composition in the molding of the molded bale is preferably 30 to 120° C., and from the viewpoints of reducing the residual solvent and inhibiting thermal deterioration, is more preferably 50 to 100° C. The temperature in the molding is preferably 30° C. or more because good moldability is thus obtained, and on the other hand, the temperature is preferably 120° C. or less because gel formation otherwise caused by thermal deterioration can be thus inhibited.

As the temperature and the pressure in the molding are higher, the specific surface area of the resultant molded bale is smaller.

A pressure holding time in the molding is preferably 3 to 30 seconds, and more preferably 5 to 20 seconds. When the pressure holding time in the compression is 30 seconds or less, high production efficiency tends to be obtained, and when it is 5 seconds or more, good moldability tends to be obtained.

In order to avoid molded bales from coming to close contact with one another, the molded bale of the present embodiment is preferably packaged in a resin film (packaging sheet).

Examples of the resin of the film include, but not limited to, polyethylene, an ethylene copolymer resin, polystyrene, high impact polystyrene, and PET.

From the viewpoints of handleability of the molded bale during transport, and difficulty in occurrence of condensation between the packaging sheet and the molded bale, the packaging sheet preferably has good adhesiveness to the molded bale.

The molded bale is contained in a vessel for transport. An expansion rate of the molded bale obtained 1 day after the molding is preferably less than 5% because the molded bale can be thus satisfactorily held in the vessel.

[Materials of Rubber Composition and Crosslinking Rubber Composition]

The rubber composition of the present embodiment may be used without crosslinking, but from the viewpoint of obtaining higher mechanical strength or the like, when a crosslinking rubber composition is produced by adding a crosslinking agent thereto to obtain a crosslinked product by crosslinking, the resultant can be used in various applications.

The rubber composition and the crosslinking rubber composition of the present embodiment contain at least the rubber-like block copolymer of the present embodiment, and the crosslinking rubber composition contains a crosslinking agent. The rubber composition and the crosslinking rubber composition of the present embodiment can further contain, if necessary, an additional rubber component, a resin, a filler and the like.

<Additional Rubber Component>

The additional rubber component used in the rubber composition of the present embodiment is not especially limited, and can be appropriately selected depending on purposes.

Examples include a styrene-butadiene rubber (of emulsion polymerization type or solution polymerization type), a natural rubber, polyisoprene, a butadiene rubber (such as high cis polybutadiene, low cis polybutadiene, syndiotactic 1,2-polybutadiene, and an acrylonitrile-butadiene rubber (NBR)), a chloroprene rubber, an ethylene-α-olefin copolymer rubber such as an ethylene-propylene rubber (EPM), an ethylene-propylene-diene rubber (EPDM), a butyl rubber, a polysulfide rubber, a silicone rubber, a fluororubber, a urethane rubber, and a "rubber-like polymer that does not contain the polymer blocks (a) and (b), and has an iodine value of 10 to 250, an ethylene structure content of 3% by mass or more, and a vinyl aromatic monomer block content of less than 10% by mass".

One of these may be singly used, or a mixture of two or more of these may be used. For obtaining the mixture, dry polymers may be mixed after polymerization, or polymers may be mixed in a solution state during polymerization.

Among the examples of <Additional Rubber Component> described above, from the viewpoints of flexibility of the crosslinking rubber composition of the present embodiment, and abrasion resistance and fuel economy of a tire, natural rubber, polyisoprene, various polybutadienes such as high cis polybutadiene and syndiotactic 1,2-polybutadiene, an ethylene-propylene-diene rubber, and a "rubber-like polymer that does not contain the polymer blocks (a) and (b), and has an iodine value of 10 to 250, an ethylene structure content of 3% by mass or more, and a vinyl aromatic monomer block content of less than 10% by mass" are preferred.

In particular, natural rubber, syndiotactic 1,2-polybutadiene, an ethylene-propylene-diene rubber, and a "rubber-like polymer that does not contain the polymer blocks (a) and (b), and has an iodine value of 10 to 250, an ethylene structure content of 3% by mass or more, and a vinyl aromatic monomer block content of less than 10% by mass" are more preferred.

Besides, from the viewpoint of high strength of the rubber composition, syndiotactic 1,2-polybutadiene, an ethylene-propylene-diene rubber, and a "rubber-like polymer that does not contain the polymer blocks (a) and (b), and has an iodine value of 10 to 250, an ethylene structure content of 3% by mass or more, and a vinyl aromatic monomer block content of less than 10% by mass" each having a crystal component are further preferred.

In addition, a "rubber-like polymer that does not contain the polymer blocks (a) and (b), and has an iodine value of 10 to 250, an ethylene structure content of 3% by mass or more, and a vinyl aromatic monomer block content of less than 10% by mass" is still further preferred.

Specific examples of a "rubber-like copolymer that does not contain the polymer blocks (a) and (b), and has an iodine value of 10 to 250, an ethylene structure content of 3% by mass or more, and a vinyl aromatic monomer block content of less than 10% by mass" include the following polymers (1) to (4):

(1) A rubber-like copolymer that has a random structure containing a vinyl aromatic monomer unit, and has an iodine value of 10 to 250, an ethylene structure content of 3% by mass or more, and a vinyl aromatic monomer block content of less than 10% by mass;

(2) a copolymer that has a random block containing a vinyl aromatic monomer unit, and a conjugated diene monomer block or an olefin block, and has an iodine value of 10 to 250, an ethylene structure content of 3% by mass or more, and a vinyl aromatic monomer block content of less than 10% by mass;

(3) a hydrogenated product of a conjugated diene homopolymer having an iodine value of 10 to 250, and an ethylene structure content of 3% by mass or more; and (4) a copolymer of conjugated diene and olefin having an iodine value of 10 to 250, and an ethylene structure content of 3% by mass or more.

When the rubber composition of the present embodiment contains, in addition to the rubber-like block copolymer of the present embodiment, a rubber-like polymer satisfying conditions of "not containing the polymer blocks (a) and (b), and having an iodine value of 10 to 250, an ethylene structure content of 3% by mass or more, and a vinyl aromatic monomer block content of less than 10% by mass", compatibility and co-crosslinkability with the rubber-like block copolymer containing the polymer blocks (a) and (b) tend to be good.

The polymer or copolymers (1) to (4) are the same in that the two polymer blocks (a) and (b) are not contained, and the hydrogenated product (3) of a conjugated diene homopolymer and the copolymer (4) of conjugated diene and olefin can be designed so that a resultant polymer has a similar structure although raw materials and production process are different.

Among these, a copolymer obtained by hydrogenating a copolymer of a vinyl aromatic monomer and conjugated diene, or a copolymer of a vinyl aromatic monomer and olefin that is a random copolymer not having a block is preferred.

When the rubber composition contains a random copolymer in addition to the rubber-like block copolymer of the present embodiment, processability of the rubber composition of the present embodiment tends to be good, or a modulus of the crosslinking rubber composition tends to be high.

In the "rubber-like polymer that does not contain the polymer blocks (a) and (b), and has an iodine value of 10 to 250, an ethylene structure content of 3% by mass or more, and a vinyl aromatic monomer block content of less than 10% by mass", from the viewpoint of crosslinkability of the crosslinking rubber composition, a content of a conjugated diene monomer unit is preferably 2% by mass or more. Besides, a difference between an SP value ($MPa^{1/2}$) of the "rubber-like polymer that does not contain the polymer blocks (a) and (b), and has an iodine value of 10 to 250, an ethylene structure content of 3% by mass or more, and a vinyl aromatic monomer block content of less than 10% by mass" and an SP value of the polymer block (a) or (b) is preferably less than ±0.2.

The difference between the SP value ($MPa^{1/2}$) of the "rubber-like polymer that does not contain the polymer blocks (a) and (b), and has an iodine value of 10 to 250, an ethylene structure content of 3% by mass or more, and a vinyl aromatic monomer block content of less than 10% y mass" and the SP value of the polymer block (a) or (b) is more preferably less than ±0.1.

From the viewpoints of tensile energy of the rubber composition of the present embodiment, and brake performance obtained in an operating temperature range in the form of a tire, the rubber composition and the crosslinking rubber composition of the present embodiment preferably contain, in addition to the rubber-like block copolymer (first polymer) of the present embodiment, one type or more of a second polymer that satisfies the requirements of the rubber-like block copolymer of the present embodiment but is different in at least one content selected from the group consisting of a content of the polymer block (a) or (b), a content of a vinyl aromatic monomer unit in the polymer block (a) or (b), an ethylene content, a conjugated diene monomer unit content, and an α-olefin content, namely, preferably contains two types or more rubber-like block copolymers in total.

It is further preferable that, in the rubber composition of the present embodiment, all of the two types or more rubber-like block copolymers each contain polymer blocks having SP values ($MPa^{1/2}$) with a difference of less than ±0.2. It is still further preferable that all of the two types or more rubber-like block copolymers each contain polymer blocks having SP values ($MPa^{1/2}$) with a difference of less than ±0.1.

<Content of Rubber-like Block Copolymer based on Total Amount of Rubber Component>

A content of the rubber-like block copolymer of the present embodiment based on a total amount of a rubber component in the rubber composition and the crosslinking rubber composition of the present embodiment is preferably 20% by mass or more, more preferably 40% by mass or more, and further preferably 60% by mass or more from the viewpoints of tensile strength and abrasion resistance of the rubber composition and the crosslinking rubber composition, and inhibition of fatigue in real vehicle driving evaluation for a tire. From the viewpoint of better property balance, a total content, based on the total amount of the rubber component, of the rubber-like block copolymer of the present embodiment, natural rubber, polyisoprene, high cis polybutadiene, syndiotactic 1,2-polybutadiene, an ethylene-propylene-diene rubber, and the "rubber-like polymer that does not contain the polymer blocks (a) and (b), and has an iodine value of 10 to 250, an ethylene structure content of 3% by mass or more, a vinyl aromatic monomer block content of less than 10% by mass, and a conjugated diene monomer unit content of 2% by mass or more" is preferably 70% by mass or more, more preferably 80% by mass or more, and further preferably 90% by mass or more.

<Resin>

The rubber composition and the crosslinking rubber composition of the present embodiment preferably contain a resin in a content of 3 to 40 parts by mass based on 100 parts by mass of the rubber component contained in the rubber composition from the viewpoints of tensile strength and tensile elongation. From the viewpoint of tensile energy, the content of the resin is more preferably 5 parts by mass or more, and further preferably 10 parts by mass or more. On the other hand, from the viewpoint of ease of mixing of the rubber composition, the content of the resin is more preferably 30 parts by mass or less, and further preferably 25 parts by mass or less.

Here, the rubber component embraces the rubber-like block copolymer of the present embodiment and the additional rubber.

The resin is a compound that is a solid at room temperature (23° C.), and substantially contains carbon and hydrogen as bases (and can contain another atom).

Examples of the resin include homopolymers using aliphatic, alicyclic, aromatic, and hydrogenated aromatic compounds, and aliphatic/aromatic copolymers using aliphatic and/or aromatic monomers as bases.

The resin may be a petroleum resin, or a natural or synthetic resin different from a petroleum resin.

The resin can be a hydrocarbon resin selected from the group consisting of cyclopentadiene (CPD) homopolymer or copolymer resins, dicyclopentadiene (DCPD) homopolymer or copolymer resins, terpene homopolymer or copolymer resins, C5 fraction homopolymer or copolymer resins, C9 fraction homopolymer or copolymer resins, α-methylstyrene homopolymer or copolymer resins, and a blend of any of these resins.

More specifically, among the above-described copolymer resins, a copolymer selected from the group consisting of (D)CPD/vinyl aromatic copolymer resins, (D)CPD/terpene copolymer resins, terpene/phenol copolymer resins, (D)CPD/C5 fraction copolymer resins, (D)CPD/C9 fraction copolymer resins, terpene/vinyl aromatic copolymer resins, terpene/phenol copolymer resins, C5 fraction/vinyl aromatic copolymer resins, and a blend of any of these resins is preferred.

One of these resins may be singly used, or two or more of these may be used together.

From the viewpoints of tensile strength and tensile elongation, the resin has a glass transition temperature of preferably 30° C. or more, and more preferably 40° C. or more. On the other hand, from the viewpoint of ease in mixing of the crosslinking rubber composition, the glass transition temperature is preferably 100° C. or less, and more preferably 80° C. or less.

<Filler>

In the rubber composition and the crosslinking rubber composition of the present embodiment, a filler can be blended from the viewpoint of improvement of a reinforcing property.

An amount of the filler blended is not especially limited but can be appropriately selected depending on purposes, and is preferably 10 to 130 parts by mass, and more preferably 30 to 90 parts by mass based on 100 parts by mass of the rubber component.

When the amount of the filler blended is 10 parts by mass or more, the effect of improving a reinforcing property resulting from blending the filler can be obtained. When the amount is 130 parts by mass or less, good processability can be retained with avoiding large deterioration of fuel economy obtained in the form of a tire.

Examples of the filler include carbon black, silica, aluminum hydroxide, clay, alumina, talc, mica, kaolin, glass balloon, glass bead, calcium carbonate, magnesium carbonate, magnesium hydroxide, magnesium oxide, titanium oxide, potassium titanate, and barium sulfate. Among these, carbon black is preferably used. One of these may be singly used, or two or more of these may be used together.

The carbon black is not especially limited, and can be appropriately selected depending on purposes, and examples include FEF, GPF, SRF, HAF, N339, IISAF, ISAF, and SAF. One of these may be singly used, or two or more of these may be used together. A nitrogen adsorption specific surface area (N2SA, measured in accordance with JIS K6217-2:

2001) of the carbon black is not especially limited, and can be appropriately selected depending on purposes.

Among these fillers, silica is preferred, and precipitated silica is more preferred from the viewpoints of fuel economy and wet skid resistance obtained when the rubber composition of the present embodiment is formed into a crosslinking rubber composition to be used in a tire tread.

An amount of silica added in the rubber composition of the present embodiment is preferably 20 parts by mass or more and 120 parts by mass or less, more preferably 40 parts by mass or more and 120 parts by mass or less, further preferably 50 parts by mass or more and 100 parts y mass or less, and still further preferably 60 parts by mass or more and 80 parts by mass or less based on 100 parts by mass of the rubber component from the viewpoints of fuel economy and wet skid resistance.

Here, the rubber component embraces the rubber-like block copolymer of the present embodiment, and the additional rubber.

From the viewpoints of improvement of dispersibility of the filler, and tensile physical strength of a crosslinked product, a silane coupling agent may be blended in the rubber composition of the present embodiment.

The silane coupling agent is preferably a compound that has a function to make close the interaction between the rubber component and the inorganic filler, has a group having affinity with or a binding property to each of the rubber component and an inorganic filler, and contains, in one molecule, a sulfur bond portion and an alkoxysilyl group or silanol group portion.

Examples of such a compound include, but are not limited to, bis-[3-(triethoxysilyl)-propyl]-tetrasulfide, bis-[3-(triethoxysilyl)-propyl]-disulfide, bis-[2-(triethoxysilyl)-ethyl]-tetrasulfide, S-[3-(triethoxysilyl)-propyl]octanethioate, a condensate of S-[3-(triethoxysilyl)-propyl]octanethioate and [(triethoxysilyl)-propyl]thiol, and a silane carrying at least one thiol (—SH) functional group (referred to as mercaptosilane) and/or at least one masked thiol group.

A content of the silane coupling agent in the rubber composition and the crosslinking rubber composition of the present embodiment is preferably 0.1 parts by mass or more and 30 parts by mass or less, more preferably 0.5 parts by mass or more and 20 parts by mass or less, and further preferably 1.0 part by mass or more and 15 parts by mass or less based on 100 parts by mass of the filler. When the content of the silane coupling agent falls in this range, there is a tendency that the effect attained by the addition of the silane coupling agent can be made further remarkable.

<Crosslinking Agent>

The crosslinking rubber composition of the present embodiment contains the rubber-like block copolymer of the present embodiment, and a crosslinking agent as described above.

The crosslinking agent is not especially limited, and can be appropriately selected depending on purposes. Examples include a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent. One of these crosslinking agents may be singly used, or two or more of these may be used together.

When the crosslinking rubber composition of the present embodiment is used as a rubber composition for a tire, a sulfur-based crosslinking agent (vulcanizing agent) is more preferably used, and in particular, sulfur is further preferably used as the crosslinking agent.

A content of the crosslinking agent in the crosslinking rubber composition is preferably 0.1 parts by mass or more and 20 parts by mass or less based on 100 parts by mass of the rubber component. The content of the crosslinking agent is preferably 0.1 parts by mass or more, more preferably 0.5 parts by mass or more, and further preferably 1.5 parts by mass or more based on 100 parts by mass of the rubber component from the viewpoints of high tensile strength and a high crosslinking speed. On the other hand, from the viewpoints of inhibition of uneven crosslinking and high tensile strength, the content is preferably 20 parts by mass or less, more preferably 5 parts by mass or less, and further preferably 3 parts by mass or less.

A vulcanization accelerator may be further used together with the vulcanizing agent.

Examples of the vulcanization accelerator include, but are not limited to, guanidine-based, aldehyde-amine-based, aldehyde-ammonia-based, thiazole-based, sulfenamide-based, thiourea-based, thiuram-based, dithiocarbamate-based, and xanthate-based compounds.

<Additives>

In the rubber composition of the present embodiment, in addition to the above-described various components, other additives can be blended.

For example, various additives such as a softener, an additional filler excluding those described above, a heat stabilizer, an antistatic agent, a weathering stabilizer, an anti-aging agent, a colorant, and a lubricant may be used.

As the additional softener, any of known softeners can be used.

Examples of the additional filler include calcium carbonate, magnesium carbonate, aluminum sulfate, and barium sulfate.

As the heat stabilizer, the antistatic agent, the weathering stabilizer, the anti-aging agent, the colorant, and the lubricant, any of known materials can be respectively used.

(Kneading Method for Rubber Composition and Crosslinking Rubber Composition)

The rubber composition and the crosslinking rubber composition of the present embodiment can be produced by mixing the rubber-like block copolymer of the present embodiment, and if necessary, the additional rubber component, the crosslinking agent, the filler, the carbon black and another filler, the silane coupling agent, and various additives such as the rubber softener.

Examples of a mixing method include, but are not limited to, a melt kneading method using a general mixer such as an open roll, a Banbury mixer, a kneader, a single screw extruder, a double screw extruder, or a multi-screw extruder, and a method in which the respective components are dissolved to be mixed, and then a solvent is removed by heating.

Among these, a melt kneading method using a roll, a Banbury mixer, a kneader or an extruder is preferred from the viewpoints of productivity and good kneadability.

Besides, either of a method in which the rubber component, the filler, the silane coupling agent and the additives are kneaded all at once, and a method in which these are mixed dividedly plural times can be employed.

[Application of Rubber Composition and Molded Article]

The rubber composition of the present embodiment is preferably used as a crosslinking rubber composition, and is applicable to tire members, interiors and exteriors of vehicles, anti-vibration rubbers, belts, shoes, foam materials, and various industrial products.

In particular, the rubber composition and the crosslinking rubber composition are suitably used in tire members.

As the tire members, these compositions can be used in, for example, various tires such as a fuel efficient tire, an all-season tire, a high performance tire, a snow tire, and a studless tire; and various portions of a tire such as a tread, a carcass, a sidewall, and a bead portion. In particular, these compositions are excellent, in the form of a vulcanizate, in balance among abrasion resistance, fuel economy, wet skid resistance, and snow performance, and therefore, are suitably used, as the tire member, for a tire tread of a fuel efficient tire, a high performance tire, or a snow tire.

As a method for producing a tire, any of common methods can be employed. For example, members usually used for production of a tire, such as a carcass layer, a belt layer, and a tread layer containing at least one selected from the group consisting of a crosslinking rubber composition before vulcanization and a tire cord, are successively overlayed on a tire forming drum to adhere to one another, and the drum is pulled out to obtain a green tire. Subsequently, the green tire is vulcanized by heating by an ordinary method, and thus, a desired tire (such as a pneumatic tire) can be produced.

EXAMPLES

The present embodiment will now be described in more detail with reference to specific Examples and Comparative Examples, and it is noted that the present embodiment is not limited to the following Examples and Comparative Examples at all.

Various physical properties of the Examples and Comparative Examples were measured by the following methods.

(Weight Average Molecular Weight (Mw) of Rubber-like Block Copolymer)

A chromatogram was measured with a GPC measuring apparatus including a series of three columns using a polystyrene-based gel as a filler, and a weight average molecular weight (Mw) of a rubber-like block copolymer was obtained based on a calibration curve obtained using standard polystyrene.

As an eluent, THF containing 5 mmol/L triethylamine was used. As columns, a guard column: trade name "TSKguardcolumn Super H-H" manufactured by Tosoh Corporation, and columns: trade names "TSKgel Super H5000", "TSKgel Super H6000", and "TSKgel Super H7000" manufactured by Tosoh Corporation were used.

Under conditions of an oven temperature of 40° C. and a THF flow rate of 0.6 mL/min, an RI detector (trade name "HLC8020" manufactured by Tosoh Corporation) was used. A measurement solution was prepared by dissolving 10 mg of a measurement sample in 20 mL of THF, and 201.1.1, of the measurement solution was injected into the GPC measuring apparatus for measurement.

(Polymer Mooney Viscosity of Rubber-like Block Copolymer)

A Mooney viscosity was measured with a Mooney viscometer (trade name "VR1132" manufactured by Ueshima Seisakusho Co., Ltd.) with an L rotor used and in accordance with ISO 289.

A measurement temperature was set to 100° C.

First, a sample was preheated for 1 minute at the test temperature, the rotor was rotated at 2 rpm, and torque was measured after 4 minutes to be defined as a Mooney viscosity ($ML_{(1+4)}$).

(Modification Ratio of Rubber-like Block Copolymer)

A modification ratio was measured by column adsorption GPC as follows by utilizing a characteristic that a rubber-like block copolymer modified with a nitrogen atom-containing functional group adsorbs on a column.

A sample solution containing a rubber-like block copolymer and low molecular weight internal standard polystyrene was measured for an amount of adsorption to a silica-based column based on a difference between a chromatogram measured with a polystyrene-based column and a chromatogram measured with a silica-based column, and thus, a modification ratio was obtained.

Specifically, the measurement was performed as follows.
Preparation of Sample Solution:

A sample solution was prepared by dissolving 10 mg of the rubber-like block copolymer and 5 mg of standard polystyrene in 20 mL of THF.

GPC Measurement Conditions using Polystyrene-based Column:

THF containing 5 mmol/L of triethylamine was used as an eluent, and 20 μL of the sample solution was injected into an apparatus for measurement. As columns, a guard column: trade name "TSKguardcolumn Super H-H" manufactured by Tosoh Corporation and columns: trade names "TSKgel Super H5000", "TSKgel Super H6000", and "TSKgel Super H7000" manufactured by Tosoh Corporation were used. Under conditions of an oven temperature of 40° C. and a THF flow rate of 0.6 mL/min, an RI detector (trade name "HLC8020" manufactured by Tosoh Corporation) was used for the measurement to obtain a chromatogram.

GPC Measurement Conditions using Silica-based Column:

An apparatus, trade name "HLC-8320GPC" manufactured by Tosoh Corporation was used, THF was used as an eluent, and 50 μL of a sample solution was injected into the apparatus. Under conditions of an oven temperature of 40° C. and a THF flow rate of 0.5 mL/min, an RI detector was used to obtain a chromatogram. As columns, trade names "Zorbax PSM-1000S", "PSM-3005", and "PSM-605" in series were used, and a column, trade name "DIOL 4.6×12.5 mm 5 micron" was connected as a guard column at a previous stage.

Calculation Method for Modification Ratio:

A modification ratio (%) was obtained in accordance with the following equation assuming that a whole peak area of the chromatogram obtained with the polystyrene-based column is 100, that a peak area of the sample is P1, that a peak area of the standard polystyrene is P2, that a whole peak area of the chromatogram obtained with the silica-based column is 100, that a peak area of the sample is P3, and that a peak area of the standard polystyrene is P4:

$$\text{Modification ratio (\%)} = [1-(P2 \times P3)/(P1 \times P4)] \times 100$$

wherein P1+P2=P3+P4=100.

(Iodine Value of Rubber-like Block Copolymer)

The iodine value of a rubber-like block copolymer was calculated in accordance with a method described in "JIS K 0070: 1992".

(Amount of Bound Styrene, Ethylene Structure Content, and Conjugated Diene Monomer Unit Content in Rubber-like Block Copolymer, Amount of Bound Styrene and Vinyl Bond Content in Butadiene Portion in Polymer Block before Hydrogenation, and Amount of Bound Styrene and Vinyl Bond Content in Butadiene Portion in Rubber-like Block Copolymer before Hydrogenation)

A rubber-like block copolymer, a polymer block before hydrogenation, and a rubber-like block copolymer before hydrogenation were used as samples to measure, by $^{1}$H-NMR measurement, an amount of bound styrene, an ethylene structure content, and a conjugated diene monomer unit content in the rubber-like block copolymer, an amount of bound styrene and a vinyl bond content in the polymer block before hydrogenation, and an amount of bound styrene and a vinyl bond content in the rubber-like block copolymer before hydrogenation.

Measurement conditions for the $^1$H-NMR measurement were as follows:

<Measurement Conditions>
Apparatus: JNM-LA400 (manufactured by JEOL Ltd.)
Solvent: deuterated chloroform
Measurement sample: rubber-like block copolymer, polymer block before hydrogenation, or rubber-like block copolymer before hydrogenation
Sample concentration: 50 mg/mL
Observation frequency: 400 MHz
Chemical shift reference: TMS (tetramethylsilane)
Pulse delay: 2.904 sec
Number of scans: 64
Pulse width: 45°
Measurement temperature: 26° C.

(Amount of Bound Styrene, α-Olefin Content, Ethylene Structure Content, and Conjugated Diene Monomer Unit Content in Polymer Block)

An amount of bound styrene, an α-olefin content, an ethylene structure content, and a conjugated diene monomer unit content in each of a polymer block (a) and a polymer block (b) were calculated based on the values, obtained by the $^1$H-NMR measurement, of the amount of bound styrene, the ethylene structure content, and the conjugated diene monomer unit content in the rubber-like block copolymer, the amount of bound styrene and the vinyl bond content in the polymer block before hydrogenation, and the amount of bound styrene and the vinyl bond content in the rubber-like block copolymer before hydrogenation, and a ratio between the polymer block (a) and the polymer block (b).

(Content of Styrene Block in Rubber-like Block Copolymer)

Assuming that a chain of eight or more styrene structure units is defined as a styrene block, the content was obtained as follows. Based on a $^1$H-NMR spectrum measured at 400 MHz with deuterated chloroform used as a solvent, a ratio of an integrated value of the following (X) in each chemical shift range was obtained, and thus, the content of the styrene block contained in the rubber-like block copolymer was obtained.

(X) Chain of eight or more aromatic vinyl compounds: $6.00 \leq S < 6.68$ (SP Value of Polymer Block)

The SP value of each polymer block was calculated as follows.

First, a molar volume and cohesive energy of each of the polymer block (a) and the polymer block (b) were calculated by a method of Bicerano (literature: J. Bicerano, Prediction of Polymer Properties, 3rd, Marcel Dekker, 2002). Here, the amount of bound styrene, the α-olefin content, the ethylene structure content, and the conjugated diene monomer unit content of each of the polymer blocks (a) and (b) calculated as described above were used.

As the cohesive energy, a value calculated in accordance with Van Krevelen method was used.

Next, an SP value of a polymer block having an arbitrary composition was obtained by a method described in formulas 17.8 to 17.10 on p. 615 of Jozef Bicerano: PREDICTION OF POLYMER PROPERTIES, Marcel Dekker, AMERICA (2002). It is noted that crystallinity and a microphase separated structure of a rubber-like block copolymer are not taken into account.

[Preparation of Hydrogenation Catalyst]

A hydrogenation catalyst used in preparing a rubber-like block copolymer in each of the Examples and Comparative Examples described below was prepared as follows.

Production Example 1

A nitrogen-substituted reaction vessel was charged with 1 L of dried and purified cyclohexane, and 100 mmol of bis(η5-cyclopentadienyl)titanium dichloride was added thereto. Under sufficient stirring, a n-hexane solution containing 200 mmol of trimethyl aluminum was added thereto to be reacted for about 3 days at room temperature, and thus, a hydrogenation catalyst (TC-1) was obtained.

[Polymerization of Rubber-like Block Copolymer]

(Polymerization Example 1) Rubber-like Block Copolymer (Polymer 1)

A temperature-controllable autoclave having an internal capacity of 40 L and equipped with a stirrer and a jacket was used as a reactor. The reactor was charged with 2,160 g of 1,3-butadiene, 240 g of styrene, and 21,000 g of cyclohexane, from which impurities had been precedently removed, and 30 mmol of tetrahydrofuran (THF) and 5.6 mmol of 2,2-bis(2-oxolanyl)propane used as polar substances, and the internal temperature of the reactor was kept at 42° C.

As a polymerization initiator, 37.5 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation.

Immediately after extracting a part of the polymer solution as described above, 444 g of 1,3-butadiene, 156 g of styrene, and 34.9 mmol of 2,2-bis(2-oxolanyl)propane were added thereto to further perform a reaction.

The temperature within the reactor finally reached 79° C. Two minutes after reaching this reaction temperature peak, 7.04 mmol of 2,2-dimethoxy-1-(3-trimethoxysilyipropyl)-1-aza-2-silacyclopentane (compound 1) was added to the reactor to perform a coupling reaction for 20 minutes. To the thus obtained polymer solution, 9.01 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation.

Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 1) had an iodine value of 61.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 1) are shown in Table 1.

(Polymerization Example 2) Rubber-like Block Copolymer (Polymer 2)

A rubber-like block copolymer solution before hydrogenation was obtained in the same manner as in (Polymerization Example 1) described above.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 70 minutes, and thus, a rubber-like block copolymer was obtained.

The rubber-like block copolymer thus obtained (polymer 2) had an iodine value of 20.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 2) are shown in Table 1.

(Polymerization Example 3) Rubber-like Block Copolymer (Polymer 3)

A rubber-like block copolymer solution before hydrogenation was obtained in the same manner as in (Polymerization Example 1) described above.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 40 minutes, and thus, a rubber-like block copolymer was obtained.

The rubber-like block copolymer thus obtained (polymer 3) had an iodine value of 102.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 3) are shown in Table 1.

(Polymerization Example 4) Rubber-like Block Copolymer (Polymer 4)

A temperature-controllable autoclave having an internal capacity of 40 L and equipped with a stirrer and a jacket was used as a reactor. The reactor was charged with 540 g of 1,3-butadiene, 60 g of styrene, and 21,000 g of cyclohexane, from which impurities had been precedently removed, and 30 mmol of tetrahydrofuran (THE) and 3.2 mmol of 2,2-bis(2-oxolanyl)propane used as polar substances, and the internal temperature of the reactor was kept at 31° C.

As a polymerization initiator, 22.6 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,776 g of 1,3-butadiene, 624 g of styrene, and 19.2 mmol of 2,2-bis(2-oxolanyl)propane were added thereto to further perform a reaction.

The temperature within the reactor finally reached 78° C. Two minutes after reaching this reaction temperature peak, 8.48 mmol of 3-(4-methylpiperazin-1-yl)propyltriethoxysilane (compound 2) was added to the reactor to perform a coupling reaction for 20 minutes. To the thus obtained polymer solution, 5.43 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 4) had an iodine value of 54.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 4) are shown in Table 1.

(Polymerization Example 5) Rubber-like Block Copolymer (Polymer 5)

A temperature-controllable autoclave having an internal capacity of 40 L and equipped with a stirrer and a jacket was used as a reactor. The reactor was charged with 1,350 g of 1,3-butadiene, 150 g of styrene, and 21,000 g of cyclohexane, from which impurities had been precedently removed, and 30 mmol of tetrahydrofuran (THF) and 3.3 mmol of 2,2-bis(2-oxolanyl)propane used as polar substances, and the internal temperature of the reactor was kept at 36° C.

As a polymerization initiator, 23.4 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,110 g of 1,3-butadiene, 390 g of styrene, and 19.9 mmol of 2,2-bis(2-oxolanyl)propane were added thereto to further perform a reaction.

The temperature within the reactor finally reached 77° C. Two minutes after reaching this reaction temperature peak, 8.79 mmol of 3-(4-methylpiperazin-1-yl)propyltriethoxysilane (compound 2) was added to the reactor to perform a coupling reaction for 20 minutes. To the thus obtained polymer solution, 5.62 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 NPa and an average temperature of 85° C. for 50 minutes, and thus, a rubber-like block copolymer was obtained. The rubber-like block copolymer thus obtained (polymer 5) had an iodine value of 58.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 5) are shown in Table 1.

(Polymerization Example 6) Rubber-like Block Copolymer (Polymer 6)

A temperature-controllable autoclave having an internal capacity of 40 L and equipped with a stirrer and a jacket was used as a reactor. The reactor was charged with 2,040 g of 1,3-butadiene, 360 g of styrene, and 21,000 g of cyclohexane, from which impurities had been precedently removed, and 30 mmol of tetrahydrofuran (THF) and 2.1 mmol of 2,2-bis(2-oxolanyl)propane used as polar substances, and the internal temperature of the reactor was kept at 36° C.

As a polymerization initiator, 23.4 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 360 g of 1,3-butadiene, 240 g of styrene, and 15.2 mmol of 2,2-bis(2-oxolanyl)propane were added thereto to further perform a reaction.

The temperature within the reactor finally reached 77° C. Two minutes after reaching this reaction temperature peak, 8.78 mmol of 3-(4-methylpiperazin-1-yl)propyltriethoxysilane (compound 2) was added to the reactor to perform a coupling reaction for 20 minutes. To the thus obtained polymer solution, 5.62 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 NPa and an average temperature of 85° C. for 50 minutes, and thus, a rubber-like block copolymer was obtained. The rubber-like block copolymer thus obtained (polymer 6) had an iodine value of 56.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 6) are shown in Table 1.

(Polymerization Example 7) Rubber-like Block Copolymer (Polymer 7)

A temperature-controllable autoclave having an internal capacity of 40 L and equipped with a stirrer and a jacket was used as a reactor. The reactor was charged with 1,584 g of 1,3-butadiene, 816 g of styrene, and 21,000 g of cyclohexane, from which impurities had been precedently removed, and 30 mmol of tetrahydrofuran (THF) and 2.2 mmol of 2,2-bis(2-oxolanyl)propane used as polar substances, and the internal temperature of the reactor was kept at 26° C.

As a polymerization initiator, 22.2 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (b) before hydrogenation. Immediately after extracting a part of the polymer solution as described above, 600 g of 1,3-butadiene, and 24.4 mmol of 2,2-bis(2-oxolanyl)propane were added thereto to further perform a reaction.

The temperature within the reactor finally reached 77° C. Two minutes after reaching this reaction temperature peak, 8.31 mmol of 3-(4-methylpiperazin-1-yl)propyltriethoxysilane (compound 2) was added to the reactor to perform a coupling reaction for 20 minutes. To the thus obtained polymer solution, 5.32 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (b) before hydrogenation and the rubber-like block copolymer before hydrogenation, a structure of a polymer block (a) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 NPa and an average temperature of 85° C. for 50 minutes, and thus, a rubber-like block copolymer was obtained. The rubber-like block copolymer thus obtained (polymer 7) had an iodine value of 59.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 7) are shown in Table 1.

(Polymerization Example 8) Rubber-like Block Copolymer (Polymer 8)

A temperature-controllable autoclave having an internal capacity of 40 L and equipped with a stirrer and a jacket was used as a reactor. The reactor was charged with 1,200 g of 1,3-butadiene, 300 g of styrene, and 21,000 g of cyclohexane, from which impurities had been precedently removed, and 30 mmol of tetrahydrofuran (THE) and 0.9 mmol of 2,2-bis(2-oxolanyl)propane used as polar substances, and the internal temperature of the reactor was kept at 39° C.

As a polymerization initiator, 23.9 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,110 g of 1,3-butadiene, 390 g of styrene, and 20.3 mmol of 2,2-bis(2-oxolanyl)propane were added thereto to further perform a reaction.

The temperature within the reactor finally reached 77° C. Two minutes after reaching this reaction temperature peak, 8.96 mmol of 3-(4-methylpyperazin-1-yl)propyltriethoxysilane (compound 2) was added to the reactor to perform a coupling reaction for 20 minutes. To the thus obtained polymer solution, 5.73 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 8) had an iodine value of 54.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 8) are shown in Table 1.

(Polymerization Example 9) Rubber-like Block Copolymer (Polymer 9)

A temperature-controllable autoclave having an internal capacity of 40 L and equipped with a stirrer and a jacket was used as a reactor. The reactor was charged with 675 g of 1,3-butadiene, 375 g of styrene, and 21,000 g of cyclohexane, from which impurities had been precedently removed, and 353 mmol of tetrahydrofuran (THF) used as a polar substance, and the internal temperature of the reactor was kept at 46° C.

As a polymerization initiator, 25.2 mmol of n-butyllithium was supplied to the reactor.

After starting a polymerization reaction, the temperature within the reactor started to increase due to heat generation through polymerization, and 1 minute after monomer conversion within the reactor reached 96%, 450 g of 1,3-butadiene was added thereto to further perform a reaction. Then, 5 minutes after the monomer conversion within the reactor reached 99%, a part of the thus obtained polymer solution was extracted and dried to obtain a polymer block (b) before hydrogenation. Immediately after extracting a part of the polymer solution as described above, 1,350 g of 1,3-butadiene, 150 g of styrene, and 5.3 mmol of 2,2-bis(2-oxolanyl)propane were added thereto to further perform a reaction.

The temperature within the reactor finally reached 76° C. Two minutes after reaching this reaction temperature peak, 9.45 mmol of 3-(4-methylpyperazin-1-yl)propyltriethoxysilane (compound 2) was added to the reactor to perform a coupling reaction for 20 minutes. To the thus obtained polymer solution, 6.05 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (b) before hydrogenation and the rubber-like block copolymer before hydrogenation, a structure of a polymer block (a) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 60 minutes, and thus, a rubber-like block copolymer was obtained. The rubber-like block copolymer thus obtained (polymer 9) had an iodine value of 58.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 9) are shown in Table 1.

(Polymerization Example 10) Rubber-like Block Copolymer (Polymer 10)

A temperature-controllable autoclave having an internal capacity of 40 L and equipped with a stirrer and a jacket was used as a reactor. The reactor was charged with 1,350 g of 1,3-butadiene, 150 g of styrene, and 21,000 g of cyclohexane, from which impurities had been precedently removed, and 30 mmol of tetrahydrofuran (THF) and 11.8 mmol of 2,2-bis(2-oxolanyl)propane used as polar substances, and the internal temperature of the reactor was kept at 34° C.

As a polymerization initiator, 78.7 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,110 g of 1,3-butadiene, 390 g of styrene, and 70.8 mmol of 2,2-bis(2-oxolanyl)propane were added thereto to further perform a reaction.

The temperature within the reactor finally reached 79° C. Two minutes after reaching this reaction temperature peak, 29.51 mmol of 3-(4-methylpyperazin-1-yl)propyltriethoxysilane (compound 2) was added to the reactor to perform a coupling reaction for 20 minutes. To the thus obtained polymer solution, 18.89 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 10) had an iodine value of 58.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 10) are shown in Table 2.

(Polymerization Example 11) Rubber-like Block Copolymer (Polymer 11)

A temperature-controllable autoclave having an internal capacity of 40 L and equipped with a stirrer and a jacket was used as a reactor. The reactor was charged with 1,350 g of 1,3-butadiene, 150 g of styrene, and 21,000 g of cyclohexane, from which impurities had been precedently removed, and 30 mmol of tetrahydrofuran (THF) and 5.9 mmol of 2,2-bis(2-oxolanyl)propane used as polar substances, and the internal temperature of the reactor was kept at 36° C.

As a polymerization initiator, 39.2 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,110 g of 1,3-butadiene, 390 g of styrene, and 35.3 mmol of 2,2-bis(2-oxolanyl)propane were added thereto to further perform a reaction.

The temperature within the reactor finally reached 76° C. Ten minutes after reaching this reaction temperature peak, 39.2 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 11) had an iodine value of 58.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 11) are shown in Table 2.

(Polymerization Example 12) Rubber-like Block Copolymer (Polymer 12)

A temperature-controllable autoclave having an internal capacity of 40 L and equipped with a stirrer and a jacket was used as a reactor. The reactor was charged with 1,500 g of 1,3-butadiene, and 21,000 g of cyclohexane, from which impurities had been precedently removed, and 30 mmol of tetrahydrofuran (THF) and 80.5 mmol of 2,2-bis(2-oxolanyl)propane used as polar substances, and the internal temperature of the reactor was kept at 24° C.

As a polymerization initiator, 80.5 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,110 g of 1,3-butadiene, and 390 g of styrene were added thereto to further perform a reaction.

The temperature within the reactor finally reached 82° C. Two minutes after reaching this reaction temperature peak, 30.2 mmol of 3-(4-methylpyperazin-1-yl)propyltriethoxysilane (compound 2) was added to the reactor to perform a coupling reaction for 20 minutes. To the thus obtained polymer solution, 19.3 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 12) had an iodine value of 61.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 12) are shown in Table 2.

(Polymerization Example 13) Rubber-like Block Copolymer (Polymer 13)

A temperature-controllable autoclave having an internal capacity of 40 L and equipped with a stirrer and a jacket was used as a reactor. The reactor was charged with 1,584 g of 1,3-butadiene, 816 g of styrene, and 21,000 g of cyclohexane, from which impurities had been precedently removed, and 30 mmol of tetrahydrofuran (THE) and 4.2 mmol of 2,2-bis(2-oxolanyl)propane used as polar substances, and the internal temperature of the reactor was kept at 33° C.

As a polymerization initiator, 42.2 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (b) before hydrogenation. Immediately after extracting a part of the polymer solution as described above, 1,500 g of 1,3-butadiene, and 42.2 mmol of 2,2-bis(2-oxolanyl)propane were added thereto to further perform a reaction.

The temperature within the reactor finally reached 76° C. Ten minutes after reaching this reaction temperature peak, 42.2 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (b) before hydrogenation and the rubber-like block copolymer before hydrogenation, a structure of a polymer block (a) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 13) had an iodine value of 65.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 13) are shown in Table 2.

(Polymerization Example 14) Rubber-like Block Copolymer (Polymer 14)

A temperature-controllable autoclave having an internal capacity of 40 L and equipped with a stirrer and a jacket was used as a reactor. The reactor was charged with 1,350 g of 1,3-butadiene, 150 g of styrene, and 21,000 g of cyclohexane, from which impurities had been precedently removed, and 30 mmol of tetrahydrofuran (THF) and 10.6 mmol of 2,2-bis(2-oxolanyl)propane used as polar substances, and the internal temperature of the reactor was kept at 31° C.

As a polymerization initiator, 59.0 mmol of n-butyllithium was supplied to the reactor.

After starting a polymerization reaction, the temperature within the reactor started to increase due to heat generation through polymerization, and 5 minutes after monomer conversion within the reactor reached 99%, a part of the thus obtained polymer solution was extracted and dried to obtain a polymer block (a) before hydrogenation. Immediately after extracting a part of the polymer solution as described above, 1,110 g of 1,3-butadiene, 390 g of styrene, and 47.2 mmol of 2,2-bis(2-oxolanyl)propane were added thereto to further perform a reaction.

The temperature within the reactor finally reached 76° C. Ten minutes after reaching this reaction temperature peak, 57.8 mmol of methanol used as a reaction terminator was added, a part of the thus obtained rubber-like block copolymer solution before hydrogenation was extracted for analysis, and the resultant was desolvated with a dryer to obtain a rubber-like block copolymer before hydrogenation. Based on analysis values of the polymer block (a) before hydrogenation and the rubber-like block copolymer before hydrogenation, a structure of a polymer block (b) before hydrogenation was calculated. Besides, an analysis value of a rubber-like block copolymer described below was used to calculate structures of polymer blocks (a) and (b) after hydrogenation reaction.

Thereafter, to the rubber-like block copolymer solution before hydrogenation, the hydrogenation catalyst (TC-1) prepared as described above (Production Example 1) was added in an amount, in terms of Ti, of 70 ppm per 100 parts by mass of the rubber-like block copolymer before hydrogenation, followed by a hydrogenation reaction at a hydrogen pressure of 0.8 MPa and an average temperature of 85° C. for 50 minutes, and thus, a rubber-like block copolymer was obtained. The rubber-like block copolymer thus obtained (polymer 14) had an iodine value of 58.

To a solution of the thus obtained rubber-like block copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like block copolymer (polymer 14) are shown in Table 2.

(Polymerization Example 15) Rubber-like Copolymer (Polymer 15)

A temperature-controllable autoclave having an internal capacity of 40 L and equipped with a stirrer and a jacket was used as a reactor. The reactor was charged with 2,700 g of 1,3-butadiene, 300 g of styrene, and 21,000 g of cyclohexane, from which impurities had been precedently removed, and 30 mmol of tetrahydrofuran (THE) and 6.2 mmol of 2,2-bis(2-oxolanyl)propane used as polar substances, and the internal temperature of the reactor was kept at 43° C.

As a polymerization initiator, 38.5 mmol of n-butyllithium was supplied to the reactor.

After starting a polymerization reaction, the temperature within the reactor started to increase due to heat generation through polymerization, and the temperature within the reactor finally reached 76° C. Two minutes after reaching this reaction temperature peak, 7.22 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 9.24 mmol of methanol used as a reaction terminator was added, a part of the thus obtained rubber-like copolymer solution before hydrogenation was extracted for analysis, and the resultant was desolvated with a dryer to obtain a rubber-like copolymer before hydrogenation.

Thereafter, to the rubber-like copolymer solution before hydrogenation, the hydrogenation catalyst (TC-1) prepared as described above (Production Example 1) was added in an amount, in terms of Ti, of 70 ppm per 100 parts by mass of the rubber-like copolymer before hydrogenation, followed by a hydrogenation reaction at a hydrogen pressure of 0.8 MPa and an average temperature of 85° C. for 50 minutes, and thus, a rubber-like copolymer was obtained. The rubber-like copolymer thus obtained (polymer 15) had an iodine value of 63.

To a solution of the thus obtained rubber-like copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like copolymer (polymer 15) are shown in Table 3.

(Polymerization Example 16) Rubber-like Copolymer (Polymer 16)

A temperature-controllable autoclave having an internal capacity of 40 L and equipped with a stirrer and a jacket was used as a reactor. The reactor was charged with 2,220 g of 1,3-butadiene, 780 g of styrene, and 21,000 g of cyclohexane, from which impurities had been precedently removed, and 30 mmol of tetrahydrofuran (THE) and 25.5 mmol of 2,2-bis(2-oxolanyl)propane used as polar substances, and the internal temperature of the reactor was kept at 36° C.

As a polymerization initiator, 34.1 mmol of n-butyllithium was supplied to the reactor.

After starting a polymerization reaction, the temperature within the reactor started to increase due to heat generation through polymerization, and the temperature within the reactor finally reached 76° C. Two minutes after reaching this reaction temperature peak, 6.39 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 8.17 mmol of methanol used as a reaction terminator was added, a part of the thus obtained rubber-like copolymer solution before hydrogenation was extracted for analysis, and the resultant was desolvated with a dryer to obtain a rubber-like copolymer before hydrogenation.

Thereafter, to the rubber-like copolymer solution before hydrogenation, the hydrogenation catalyst (TC-1) prepared as described above (Production Example 1) was added in an amount, in terms of Ti, of 70 ppm per 100 parts by mass of the rubber-like copolymer before hydrogenation, followed by a hydrogenation reaction at a hydrogen pressure of 0.8 MPa and an average temperature of 85° C. for 50 minutes, and thus, a rubber-like copolymer was obtained. The rubber-like copolymer thus obtained (polymer 16) had an iodine value of 52.

To a solution of the thus obtained rubber-like copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like copolymer (polymer 16) are shown in Table 3.

(Polymerization Example 17) Rubber-like Copolymer (Polymer 17)

A temperature-controllable autoclave having an internal capacity of 40 L and equipped with a stirrer and a jacket was used as a reactor. The reactor was charged with 1,800 g of 1,3-butadiene, 1,200 g of styrene, and 21,000 g of cyclohexane, from which impurities had been precedently removed, and 30 mmol of tetrahydrofuran (THE) and 6.3 mmol of 2,2-bis(2-oxolanyl)propane used as polar substances, and the internal temperature of the reactor was kept at 40° C.

As a polymerization initiator, 31.5 mmol of n-butyllithium was supplied to the reactor.

After starting a polymerization reaction, the temperature within the reactor started to increase due to heat generation through polymerization, and the temperature within the reactor finally reached 74° C. Two minutes after reaching this reaction temperature peak, 5.90 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 7.56 mmol of methanol used as a reaction terminator was added, a part of the thus obtained rubber-like copolymer solution before hydrogenation was extracted for analysis, and the resultant was desolvated with a dryer to obtain a rubber-like copolymer before hydrogenation.

Thereafter, to the rubber-like copolymer solution before hydrogenation, the hydrogenation catalyst (TC-1) prepared as described above (Production Example 1) was added in an amount, in terms of Ti, of 70 ppm per 100 parts by mass of the rubber-like copolymer before hydrogenation, followed by a hydrogenation reaction at a hydrogen pressure of 0.8 MPa and an average temperature of 85° C. for 50 minutes, and thus, a rubber-like copolymer was obtained. The rubber-like copolymer thus obtained (polymer 17) had an iodine value of 42.

To a solution of the thus obtained rubber-like copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like copolymer (polymer 17) are shown in Table 3.

(Polymerization Example 18) Rubber-like Copolymer (Polymer 18)

A temperature-controllable autoclave having an internal capacity of 40 L and equipped with a stirrer and a jacket was used as a reactor. The reactor was charged with 2,700 g of 1,3-butadiene, 300 g of styrene, and 21,000 g of cyclohexane, from which impurities had been precedently removed, and 30 mmol of tetrahydrofuran (THF) and 6.2 mmol of 2,2-bis(2-oxolanyl)propane used as polar substances, and the internal temperature of the reactor was kept at 43° C.

As a polymerization initiator, 38.5 mmol of n-butyllithium was supplied to the reactor.

After starting a polymerization reaction, the temperature within the reactor started to increase due to heat generation through polymerization, and the temperature within the reactor finally reached 76° C. Two minutes after reaching this reaction temperature peak, 7.22 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 9.24 mmol of methanol used as a reaction terminator was added, a part of the thus obtained rubber-like copolymer solution before hydrogenation was extracted for analysis, and the resultant was desolvated with a dryer to obtain a rubber-like copolymer (polymer 18).

To a solution of the thus obtained rubber-like copolymer, 12.6 g of n-octadecyl-3-(3,5-di-t-butyl-4-hydroxyphenyl)-propionate and 3.0 g of 4,6-bis(octylthiomethyl)-o-cresol were added as antioxidants, and the resultant was subjected to a drying treatment.

Analysis results of the rubber-like copolymer (polymer 18) are shown in Table 3.

TABLE 1

| | | | Polymerization Example Polymer | Polymerization Example 1 Polymer 1 | Polymerization Example 2 Polymer 2 | Polymerization Example 3 Polymer 3 | Polymerization Example 4 Polymer 4 | Polymerization Example 5 Polymer 5 |
|---|---|---|---|---|---|---|---|---|
| Polymer Block (a) before Hydrogenation | | Amount of Bound Styrene | mass % | 10.0 | 10.0 | 10.0 | 10.0 | 10.0 |
| | | Vinyl Bond Content | mol % | 40.0 | 40.0 | 40.0 | 40.0 | 40.0 |
| Polymer Block (b) before Hydrogenation | | Amount of Bound Styrene | mass % | 26.0 | 26.0 | 26.0 | 26.0 | 26.0 |
| | | Vinyl Bond Content | mol % | 55.0 | 55.0 | 55.0 | 55.0 | 55.0 |
| Rubber-like Block Copolymer before Hydrogenation | | Modifier | — | Compound 1 | Compound 1 | Compound 1 | Compound 2 | Compound 2 |
| | | Amount of Bound Styrene | mass % | 13.2 | 13.2 | 13.2 | 22.8 | 18.0 |
| | | Vinyl Bond Content | mol % | 42.6 | 42.6 | 42.6 | 51.5 | 46.8 |
| Rubber-like Block Copolymer | Polymer Block (a) | Amount of Bound Styrene | mass % | 9.8 | 9.7 | 9.8 | 9.8 | 9.8 |
| | | α-Olefin Content | mass % | 40.2 | 40.1 | 40.4 | 40.2 | 40.2 |
| | | Ethylene Structure Content | mass % | 45.2 | 55.1 | 35.3 | 45.2 | 45.2 |
| | | Conjugated Diene Monomer Unit Content | mass % | 14.5 | 4.8 | 24.3 | 14.5 | 14.5 |
| | | SP Value | $MPa^{1/2}$ | 17.0 | 16.9 | 17.1 | 17.0 | 17.0 |
| | | Ratio | mass % | 80 | 80 | 80 | 20 | 50 |
| | Polymer Block (b) | Amount of Bound Styrene | mass % | 25.8 | 25.7 | 25.8 | 25.8 | 25.8 |
| | | α-Olefin Content | mass % | 55.3 | 55.1 | 55.5 | 55.3 | 55.3 |
| | | Ethylene Structure Content | mass % | 30.2 | 40.1 | 20.2 | 30.2 | 30.2 |
| | | Conjugated Diene Monomer Unit Content | mass % | 14.5 | 4.8 | 24.3 | 14.5 | 14.5 |
| | | SP Value | $MPa^{1/2}$ | 17.3 | 17.3 | 17.3 | 17.3 | 17.3 |
| | | Ratio | mass % | 20 | 20 | 20 | 80 | 50 |
| | | Weight Average Molecular Weight | ten thousand | 35 | 35 | 35 | 40 | 40 |
| | | Mooney Viscosity | — | 78 | 89 | 69 | 63 | 67 |
| | | Iodine Value | I g/100 g | 61 | 20 | 102 | 54 | 58 |
| | | Amount of Bound Styrene | mass % | 13.0 | 12.9 | 13.0 | 22.6 | 17.8 |
| | | Ethylene Structure Content | mass % | 37.1 | 44.4 | 29.1 | 27.1 | 31.9 |
| | | Conjugated Diene Monomer Unit Content | mass % | 12.1 | 4.8 | 20.1 | 9.8 | 11.2 |
| | | Styrene Block Content | mass % | 1.7 | 1.7 | 1.7 | 1.8 | 1.8 |
| | | Modification Ratio | % | 75 | 75 | 75 | 75 | 75 |

| | | | Polymerization Example Polymer | Polymerization Example 6 Polymer 6 | Polymerization Example 7 Polymer 7 | Polymerization Example 8 Polymer 8 | Polymerization Example 9 Polymer 9 |
|---|---|---|---|---|---|---|---|
| Polymer Block (a) before Hydrogenation | | Amount of Bound Styrene | mass % | 15.0 | 0.0 | 20.0 | 10.0 |
| | | Vinyl Bond Content | mol % | 29.0 | 65.0 | 24.0 | 40.0 |
| Polymer Block (b) before Hydrogenation | | Amount of Bound Styrene | mass % | 40.0 | 34.0 | 26.0 | 25.0 |
| | | Vinyl Bond Content | mol % | 40.0 | 28.0 | 53.0 | 16.0 |
| Rubber-like Block Copolymer before Hydrogenation | | Modifier | — | Compound 2 | Compound 2 | Compound 2 | Compound 2 |
| | | Amount of Bound Styrene | mass % | 20.0 | 27.2 | 23.0 | 17.5 |
| | | Vinyl Bond Content | mol % | 30.7 | 38.2 | 38.5 | 26.8 |
| Rubber-like Block Copolymer | Polymer Block (a) | Amount of Bound Styrene | mass % | 14.8 | 0.0 | 19.7 | 9.8 |
| | | α-Olefin Content | mass % | 29.2 | 65.4 | 24.1 | 38.4 |
| | | Ethylene Structure Content | mass % | 56.3 | 20.1 | 61.4 | 47.1 |
| | | Conjugated Diene Monomer Unit Content | mass % | 14.5 | 14.5 | 14.5 | 14.5 |
| | | SP Value | $MPa^{1/2}$ | 17.1 | 16.6 | 17.3 | 17.0 |
| | | Ratio | mass % | 80 | 20 | 50 | 50 |

TABLE 1-continued

| | | | | | | | |
|---|---|---|---|---|---|---|---|
| Polymer Block (b) | Amount of Bound Styrene | mass % | 39.9 | 33.8 | 25.8 | 24.8 |
| | α-Olefin Content | mass % | 40.2 | 28.2 | 53.4 | 15.9 |
| | Ethylene Structure Content | mass % | 45.2 | 57.3 | 32.1 | 69.5 |
| | Conjugated Diene Monomer Unit Content | mass % | 14.5 | 14.5 | 14.5 | 14.6 |
| | SP Value | MPa$^{1/2}$ | 17.7 | 17.6 | 17.3 | 17.4 |
| | Ratio | mass % | 20 | 80 | 50 | 50 |
| | Weight Average Molecular Weight | ten thousand | 40 | 40 | 35 | 35 |
| | Mooney Viscosity | — | 72 | 76 | 65 | 78 |
| | Iodine Value | I g/100 g | 56 | 51 | 54 | 58 |
| | Amount of Bound Styrene | mass % | 19.8 | 27.0 | 22.8 | 17.3 |
| | Ethylene Structure Content | mass % | 43.7 | 34.9 | 36.1 | 48.2 |
| | Conjugated Diene Monomer Unit Content | mass % | 11.3 | 9.6 | 11.1 | 11.8 |
| | Styrene Block Content | mass % | 2 | 1.4 | 2 | 2.2 |
| | Modification Ratio | % | 75 | 75 | 75 | 75 |

TABLE 2

| | | | | Polymerization Example 10 Polymer 10 | Polymerization Example 11 Polymer 11 | Polymerization Example 12 Polymer 12 |
|---|---|---|---|---|---|---|
| Polymer Block (a) before Hydrogenation | | Amount of Bound Styrene | mass % | 10.0 | 10.0 | 0.0 |
| | | Vinyl Bond Content | mol % | 40.0 | 40.0 | 65.0 |
| Polymer Block (b) before Hydrogenation | | Amount of Bound Styrene | mass % | 26.0 | 26.0 | 26.0 |
| | | Vinyl Bond Content | mol % | 55.0 | 55.0 | 55.0 |
| Rubber-like Block Copolymer before Hydrogenation | | Modifier | — | Compound 2 | — | Compound 2 |
| | | Amount of Bound Styrene | mass % | 18.0 | 18.0 | 13.0 |
| | | Vinyl Bond Content | mol % | 46.8 | 46.8 | 60.7 |
| Rubber-like Block Copolymer | Polymer Block (a) | Amount of Bound Styrene | mass % | 9.8 | 9.8 | 0.0 |
| | | α-Olefin Content | mass % | 40.2 | 40.2 | 65.4 |
| | | Ethylene Structure Content | mass % | 45.2 | 45.2 | 20.1 |
| | | Conjugated Diene Monomer Unit Content | mass % | 14.5 | 14.5 | 14.5 |
| | | SP Value | MPa$^{1/2}$ | 17.0 | 17.0 | 16.6 |
| | | Ratio | mass % | 50 | 50 | 50 |
| | Polymer Block (b) | Amount of Bound Styrene | mass % | 25.8 | 25.8 | 25.8 |
| | | α-Olefin Content | mass % | 55.3 | 55.3 | 55.3 |
| | | Ethylene Structure Content | mass % | 30.2 | 30.2 | 30.2 |
| | | Conjugated Diene Monomer Unit Content | mass % | 14.5 | 14.5 | 14.5 |
| | | SP Value | MPa$^{1/2}$ | 17.3 | 17.3 | 17.3 |
| | | Ratio | mass % | 50 | 50 | 50 |
| | | Weight Average Molecular Weight | ten thousand | 11 | 12 | 11 |
| | | Mooney Viscosity | — | 30 | 35 | 31 |
| | | Iodine Value | I g/100 g | 58 | 58 | 61 |
| | | Amount of Bound Styrene | mass % | 17.8 | 17.8 | 12.9 |
| | | Ethylene Structure Content | mass % | 31.9 | 31.9 | 21.7 |
| | | Conjugated Diene Monomer Unit Content | mass % | 11.2 | 11.2 | 11.8 |
| | | Styrene Block Content | mass % | 1.8 | 1.8 | 1.2 |
| | | Modification Ratio | % | 75 | 0 | 75 |

| | | | | Polymerization Example 13 Polymer 13 | Polymerization Example 14 Polymer 14 |
|---|---|---|---|---|---|
| Polymer Block (a) before Hydrogenation | | Amount of Bound Styrene | mass % | 0.0 | 10.0 |
| | | Vinyl Bond Content | mol % | 65.0 | 40.0 |
| Polymer Block (b) before Hydrogenation | | Amount of Bound Styrene | mass % | 34.0 | 26.0 |
| | | Vinyl Bond Content | mol % | 28.0 | 55.0 |
| Rubber-like Block Copolymer before Hydrogenation | | Modifier | — | — | — |
| | | Amount of Bound Styrene | mass % | 17.0 | 18.0 |
| | | Vinyl Bond Content | mol % | 50.3 | 46.8 |
| Rubber-like Block Copolymer | Polymer Block (a) | Amount of Bound Styrene | mass % | 0.0 | 9.8 |
| | | α-Olefin Content | mass % | 65.4 | 40.2 |
| | | Ethylene Structure Content | mass % | 20.1 | 45.2 |
| | | Conjugated Diene Monomer Unit Content | mass % | 14.5 | 14.5 |
| | | SP Value | MPa$^{1/2}$ | 16.6 | 17.0 |
| | | Ratio | mass % | 50 | 50 |

TABLE 2-continued

| | | | | | |
|---|---|---|---|---|---|
| Polymer Block (b) | Amount of Bound Styrene | mass % | 33.9 | 25.8 |
| | α-Olefin Content | mass % | 28.2 | 55.3 |
| | Ethylene Structure Content | mass % | 57.3 | 30.2 |
| | Conjugated Diene Monomer Unit Content | mass % | 14.5 | 14.5 |
| | SP Value | MPa$^{1/2}$ | 17.6 | 17.3 |
| | Ratio | mass % | 50 | 50 |
| | Weight Average Molecular Weight | ten thousand | 12 | 8 |
| | Mooney Viscosity | — | 38 | unmeasurable |
| | Iodine Value | I g/100 g | 59 | 58 |
| | Amount of Bound Styrene | mass % | 17.0 | 17.8 |
| | Ethylene Structure Content | mass % | 29.4 | 31.9 |
| | Conjugated Diene Monomer Unit Content | mass % | 11.2 | 11.2 |
| | Styrene Block Content | mass % | 1.7 | 1.8 |
| | Modification Ratio | % | 0 | 0 |

TABLE 3

| | | Polymerization Example Polymer | | Polymerization Example 15 Polymer 15 | Polymerization Example 16 Polymer 16 |
|---|---|---|---|---|---|
| Polymer Block (a) before Hydrogenation | | Amount of Bound Styrene | mass % | 10.0 | 26.0 |
| | | Vinyl Bond Content | mol % | 40.0 | 55.0 |
| Polymer Block (b) before Hydrogenation | | Amount of Bound Styrene | mass % | — | — |
| | | Vinyl Bond Content | mol % | — | — |
| Rubber-like Block Copolymer before Hydrogenation | | Modifier | — | Compound 1 | Compound 1 |
| | | Amount of Bound Styrene | mass % | 10.0 | 26.0 |
| | | Vinyl Bond Content | mol % | 40.0 | 55.0 |
| Rubber-like Copolymer | Polymer Block (a) | Amount of Bound Styrene | mass % | 9.8 | 25.8 |
| | | α-Olefin Content | mass % | 40.2 | 55.3 |
| | | Ethylene Structure Content | mass % | 40.8 | 26.4 |
| | | Conjugated Diene Monomer Unit Content | mass % | 13.1 | 12.7 |
| | | SP Value | MPa$^{1/2}$ | 17.0 | 17.3 |
| | | Ratio | mass % | 100 | 100 |
| | Polymer Block (b) | Amount of Bound Styrene | mass % | 0 | 0 |
| | | α-Olefin Content | mass % | 0 | 0 |
| | | Ethylene Structure Content | mass % | 0 | 0 |
| | | Conjugated Diene Monomer Unit Content | mass % | 0 | 0 |
| | | SP Value | MPa$^{1/2}$ | — | — |
| | | Ratio | mass % | 0 | 0 |
| | | Weight Average Molecular Weight | ten thousand | 35 | 35 |
| | | Mooney Viscosity | — | 76 | 69 |
| | | Iodine Value | I g/100 g | 63 | 52 |
| | | Amount of Bound Styrene | mass % | 9.9 | 25.6 |
| | | Ethylene Structure Content | mass % | 40.1 | 23.9 |
| | | Conjugated Diene Monomer Unit Content | mass % | 13.2 | 8.9 |
| | | Styrene Block Content | mass% | 1.8 | 2.1 |
| | | Modification Ratio | % | 75 | 75 |

| | | Polymerization Example Polymer | | Polymerization Example 17 Polymer 17 | Polymerization Example 18 Polymer 18 |
|---|---|---|---|---|---|
| Polymer Block (a) before Hydrogenation | | Amount of Bound Styrene | mass % | 40.0 | 10.0 |
| | | Vinyl Bond Content | mol % | 40.0 | 40.0 |
| Polymer Block (b) before Hydrogenation | | Amount of Bound Styrene | mass % | — | — |
| | | Vinyl Bond Content | mol % | — | — |
| Rubber-like Block Copolymer before Hydrogenation | | Modifier | — | Compound 1 | Compound 1 |
| | | Amount of Bound Styrene | mass % | 40.0 | 10.0 |
| | | Vinyl Bond Content | mol % | 40.0 | 40.0 |
| Rubber-like Copolymer | Polymer Block (a) | Amount of Bound Styrene | mass % | 39.9 | 9.8 |
| | | α-Olefin Content | mass % | 40.2 | 0.0 |
| | | Ethylene Structure Content | mass % | 37.9 | 0.0 |
| | | Conjugated Diene Monomer Unit Content | mass % | 12.2 | 100.0 |
| | | SP Value | MPa$^{1/2}$ | 17.7 | 17.6 |
| | | Ratio | mass % | 100 | 100 |
| | Polymer Block (b) | Amount of Bound Styrene | mass % | 0 | 0 |
| | | α-Olefin Content | mass % | 0 | 0 |
| | | Ethylene Structure Content | mass % | 0 | 0 |
| | | Conjugated Diene Monomer Unit Content | mass % | 0 | 0 |
| | | SP Value | MPa$^{1/2}$ | — | — |
| | | Ratio | mass % | 0 | 0 |
| | | Weight Average Molecular Weight | ten thousand | 35 | 35 |
| | | Mooney Viscosity | — | 79 | 47 |
| | | Iodine Value | I g/100 g | 42 | 423 |
| | | Amount of Bound Styrene | mass % | 39.6 | 10.0 |
| | | Ethylene Structure Content | mass % | 28.4 | 0.0 |

TABLE 3-continued

| | | | |
|---|---|---|---|
| Conjugated Diene Monomer Unit Content | mass % | 7.2 | 90.0 |
| Styrene Block Content | mass% | 2.3 | 1.8 |
| Modification Ratio | % | 75 | 75 |

Compounds 1 and 2 shown in Tables 1 to 3 are as follows:

Compound 1: 2,2-dimethoxy-1-(3-trimethoxysilyipropyl)-1-aza-2-silacyclopentane

Compound 2: 3-(4-methylpiperazin-1-yl)propyltriethoxysilane

[Production of Molded Bale, Preparation of Compound, and Evaluation of Physical Properties]

The polymers 1 to 18 were produced respectively in accordance with Polymerization Examples 1 to 18 shown in Tables 1 to 3 in amounts according with a size of a molded bale to be produced, and the thus obtained rubber-like block copolymers and rubber-like copolymers are compression molded to obtain molded bales (size: width W of 340 mm, length L of 680 mm, and height H of 180 mm).

Next, the polymers 1 to 18 of the molded bales and natural rubber were used as raw material rubber components to produce rubber compositions (Examples 1 to 16 and Comparative Examples 1 to 3) containing the respective raw material rubber components in accordance with the following compositions.

The amounts of the polymers 1 to 18 and the natural rubber constituting and blended in the raw material rubber components are shown in Tables 4 to 6.

In using the molded bale, the molded bale was crushed into a size easy to use before the use.

(Blending Conditions)

The amount of each compounding agent added was expressed in parts by mass based on 100 parts by mass of the rubber component excluding a rubber softener.

Silica 1 (trade name "Ultrasil 7000GR" manufactured by Evonik Degussa, nitrogen adsorption specific surface area: 170 m$^2$/g): 50.0 parts by mass Silica 2 (trade name "Zeosil Premium 200 MP" manufactured by Rhodia, nitrogen adsorption specific surface area: 220 m$^2$/g): 25.0 parts by mass Carbon black (trade name "Seast KH (N339)" manufactured by Tokai Carbon Co., Ltd.): 5.0 parts by mass Silane coupling agent (trade name "Si75" manufactured by Evonik Degussa, bis(triethoxysilylpropyl)disulfide): 6.0 parts by mass SRAE oil (trade name "Process NC140" manufactured by JX Nippon Oil & Energy Corporation): 25.0 parts by mass Zinc powder: 2.5 parts by mass Stearic acid: 1.0 part by mass Anti-aging agent (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazylsulfinamide): 1.7 parts by mass Vulcanization accelerator 2 (diphenylguanidine): 2.0 parts by mass Total: 222.4 parts by mass (Kneading Method)

The above-described materials were kneaded as follows to obtain a rubber composition. A closed kneader (having an internal capacity of 0.3 L) equipped with a temperature controller was used to knead, as first stage kneading, the raw material rubber, the fillers (silica 1, silica 2, and carbon black), the silane coupling agent, the SRAE oil, zinc powder and stearic acid under conditions of a filling rate of 65% and a rotor speed of 30 to 50 rpm. Here, the temperature of the closed mixer was controlled to obtain the rubber composition (compound) at a discharge temperature of 155 to 160° C.

Next, as second stage kneading, after the compound obtained as described above was cooled to room temperature, the anti-aging agent was added thereto, and the resultant was kneaded again for improving dispersibility of the silica. Also in this case, the discharge temperature of the compound was adjusted to 155 to 160° C. by the temperature control of the mixer. After cooling, as third stage kneading, the resultant was kneaded with sulfur and the vulcanization accelerators 1 and 2 added thereto with an open roll set to 70° C. Thereafter, the resultant was molded, and vulcanized with a vulcanization press at 160° C. for 20 minutes. The rubber composition before vulcanization and the rubber composition after the vulcanization were evaluated. Specifically, the evaluations were performed by the following methods. Results are shown in Tables 7 to 9.

(Evaluation 1) Tensile Strength and Tensile Elongation

Breaking strength and elongation at break were measured in accordance with a tensile test method of JIS K6251.

Tables 7 to 9 show evaluation results of Examples 1 to 16 and Comparative Examples 2 and 3 expressed as indexes obtained by assuming that the breaking strength and the elongation at break of Comparative Example 1 were respectively 100.

A larger index indicates better tensile strength and tensile elongation.

(Evaluation 2) Abrasion Resistance

The abrasion resistance was measured in accordance with DIN abrasion test of JIS K6264-2.

Table 3 shows evaluation results of Examples 1 to 16 and Comparative Examples 2 and 3 expressed as indexes obtained by assuming that the abrasion resistance of Comparative Example 1 was 100. A larger index indicates better abrasion resistance.

(Evaluation 3) Fatigue Reduction

A 195/65R15 tire was produced by using each of the rubber compositions in a tread, a turbocharged passenger car with 1.6 liter displacement was fit with such a tire as both front and rear tires, and fatigue of a driver was evaluated after driving about 100 km on roads including an ordinary road and a highway.

Assuming that a test result obtained with a tire using the rubber composition of Comparative Example 1 is determined as Δ, fatigue increased by less than 10%, equivalent, or reduced by less than 10% as compared with the result of Comparative Example 1 was determined as Δ, fatigue reduced by 10% or more and less than 20% was determined as O, fatigue reduced by 20% or more was determined as ⊚, and fatigue increased by 10% or more was determined as X.

TABLE 4

| Polymer | | Example 1 | Example 2 | Example 3 | Example 4 | Example 5 | Example 6 | Example 7 | Example 8 |
|---|---|---|---|---|---|---|---|---|---|
| 1 | parts by mass | 100 | 70 | | | | | | |
| 2 | parts by mass | | | 70 | | | | | |
| 3 | parts by mass | | | | 70 | | | | |
| 4 | parts by mass | | | | | 70 | | | |
| 5 | parts by mass | | | | | | 100 | 80 | |
| 6 | parts by mass | | | | | | | | 70 |
| 7 | parts by mass | | | | | | | | |
| 8 | parts by mass | | | | | | | | |
| 9 | parts by mass | | | | | | | | |
| 10 | parts by mass | | | | | | | | |
| 11 | parts by mass | | | | | | | | |
| 12 | parts by mass | | | | | | | | |
| 13 | parts by mass | | | | | | | | |
| 14 | parts by mass | | | | | | | | |
| 15 | parts by mass | | | | | 30 | | | |
| 16 | parts by mass | | 30 | 30 | 30 | | | 20 | |
| 17 | parts by mass | | | | | | | | 30 |
| 18 | parts by mass | | | | | | | | |
| Natural Rubber | parts by mass | | | | | | | | |

TABLE 5

| Polymer | | Example 9 | Example 10 | Example 11 | Example 12 | Example 13 | Example 14 | Example 15 | Example 16 |
|---|---|---|---|---|---|---|---|---|---|
| 1 | parts by mass | | | | | | | | |
| 2 | parts by mass | | | | | | | | |
| 3 | parts by mass | | | | | | | | |
| 4 | parts by mass | | | | | | | | |
| 5 | parts by mass | | | | | | | | |
| 6 | parts by mass | | | | | | | | |
| 7 | parts by mass | 70 | | | | | | | |
| 8 | parts by mass | | 80 | | | | | | |
| 9 | parts by mass | | | 70 | | | | | |
| 10 | parts by mass | | | | 10 | | | | |
| 11 | parts by mass | | | | | 10 | | | |
| 12 | parts by mass | | | | | | 10 | | |
| 13 | parts by mass | | | | | | | 10 | |
| 14 | parts by mass | | | | | | | | 6 |
| 15 | parts by mass | | | 30 | 45 | 45 | | 45 | 47 |
| 16 | parts by mass | | 20 | | 45 | 45 | 60 | | 47 |
| 17 | parts by mass | | | | | | | | |
| 18 | parts by mass | | | | | | | | |
| Natural Rubber | parts by mass | 30 | | | | | 30 | 45 | |

TABLE 6

| Polymer | | Comparative Example 1 | Comparative Example 2 | Comparative Example 3 |
|---|---|---|---|---|
| 1 | parts by mass | | | |
| 2 | parts by mass | | | |
| 3 | parts by mass | | | |
| 4 | parts by mass | | | |
| 5 | parts by mass | | | |
| 6 | parts by mass | | | |
| 7 | parts by mass | | | |
| 8 | parts by mass | | | |
| 9 | parts by mass | | | |
| 10 | parts by mass | | | |
| 11 | parts by mass | | | |
| 12 | parts by mass | | | |
| 13 | parts by mass | | | |
| 14 | parts by mass | | | |
| 15 | parts by mass | 50 | | 50 |
| 16 | parts by mass | 50 | 100 | |
| 17 | parts by mass | | | |
| 18 | parts by mass | | | 50 |
| Natural Rubber | parts by mass | | | |

TABLE 7

| | | Example 1 | Example 2 | Example 3 | Example 4 | Example 5 | Example 6 | Example 7 | Example 8 |
|---|---|---|---|---|---|---|---|---|---|
| Tensile Elongation | Index | 119 | 115 | 124 | 121 | 112 | 120 | 124 | 127 |
| Tensile Strength | Index | 116 | 120 | 131 | 119 | 123 | 119 | 125 | 128 |
| Abrasion Resistance | Index | 122 | 115 | 120 | 113 | 110 | 115 | 124 | 109 |
| Fatigue Reduction | Evaluation | ○ | ○ | ◎ | ○ | ◎ | ○ | ◎ | ○ |

TABLE 8

|  |  | Example 9 | Example 10 | Example 11 | Example 12 | Example 13 | Example 14 | Example 15 | Example 16 |
|---|---|---|---|---|---|---|---|---|---|
| Tensile Elongation | Index | 127 | 109 | 106 | 117 | 107 | 126 | 111 | 105 |
| Tensile Strength | Index | 124 | 115 | 109 | 120 | 121 | 122 | 113 | 115 |
| Abrasion Resistance | Index | 105 | 106 | 105 | 109 | 106 | 110 | 129 | 104 |
| Fatigue Reduction | Evaluation | Δ | ◯ | ◯ | ◯ | ◯ | Δ | Δ | Δ |

TABLE 9

|  |  | Comparative Example 1 | Comparative Example 2 | Comparative Example 3 |
|---|---|---|---|---|
| Tensile Elongation | Index | 100 | 102 | 93 |
| Tensile Strength | Index | 100 | 114 | 86 |
| Abrasion Resistance | Index | 100 | 92 | 88 |
| Fatigue Reduction | Evaluation | Δ | ◯ | X |

As shown in Tables 7 to 9, it was confirmed that Examples 1 to 16 are excellent in balance among tensile strength, tensile elongation and abrasion resistance, and also excellent in fatigue reduction in driving as compared with Comparative Examples 1 to 3.

The molded bale of the present embodiment is suitable as a constituent material of a crosslinking rubber composition, and specifically, is industrially applicable in the fields of tire members, interiors and exteriors of vehicles, anti-vibration rubbers, belts, shoes, foam materials, and various industrial products.

What is claimed is:

1. A molded bale of a rubber block copolymer, the rubber block copolymer comprising:
   5% by mass or more and 95% by mass or less of a polymer block (a) having a content of a vinyl aromatic monomer unit of 22% by mass or less; and
   5% by mass or more and 95% by mass or less of a polymer block (b) having a content of a vinyl aromatic monomer unit of 23% by mass or more and less than 50% by mass,
   wherein the rubber-like block copolymer has an iodine value of 10 to 250, an ethylene structure content of 3% by mass or more, and a vinyl aromatic monomer block content of less than 10% by mass.

2. The molded baled of the rubber block copolymer according to claim 1,
   wherein an α-olefin content in a monomer unit excluding the vinyl aromatic monomer unit in the polymer block (b) is 17% by mass or more.

3. The molded baled of the rubber block copolymer according to claim 1,
   wherein the content of the vinyl aromatic monomer unit in the polymer block (b) is less than 40% by mass.

4. The molded baled of the rubber block copolymer according to claim 1,
   wherein an SP value (MPa$^{1/2}$) of the polymer block (a) is 16.4 or more and 18.5 or less.

5. The molded baled of the rubber block copolymer according to claim 1,
   wherein the rubber-like block copolymer constituting the molded bale has a weight average molecular weight of 100,000 or more.

6. The molded baled of the rubber block copolymer according to claim 1,
   wherein the rubber-like block copolymer constituting the molded bale contains 5% by mass or more of the vinyl aromatic monomer unit.

7. The molded baled of the rubber block copolymer according to claim 1,
   wherein the rubber-like block copolymer constituting the molded bale contains a nitrogen atom.

8. The molded baled of the rubber block copolymer according to claim 1,
   wherein the rubber-like block copolymer constituting the molded bale has a modification ratio, measured by column adsorption GPC, of 40% by mass or more.

9. A rubber composition, comprising:
   the rubber block copolymer constituting the molded bale according to claim 1, and
   at least any one selected from the group consisting of the following (1) to (4):
   (1) a rubber-like copolymer that has a random structure containing a vinyl a romatic monomer unit, and has an iodine value of 10 to 250, an ethylene structure content of 3% by mass or more, and a vinyl aromatic monomer block content of less than 10% by mass;
   (2) a copolymer that has a random block containing a vinyl aromatic monomer unit, and a conjugated diene monomer block or an olefin block, and has an iodine value of 10 to 250, an ethylene structure content of 3% by mass or more, and a vinyl aromatic monomer block content of less than 10% by mass;
   (3) a hydrogenated product of a conjugated diene homopolymer having an iodine value of 10 to 250, and an ethylene structure content of 3% by mass or more; and
   (4) a copolymer of conjugated diene and olefin having an iodine value of 10 to 250, and an ethylene structure content of 3% by mass or more.

10. A rubber composition, comprising:
    a first polymer corresponding to the rubber block copolymer constituting the molded bale according to claim 1; and
    a second polymer corresponding to the rubber block copolymer constituting the molded bale according to claim 1 that is different from the first polymer in at least one content selected from the group consisting of a content of the polymer block (a) or (b) in the rubber-like block copolymer, a content of the vinyl aromatic monomer unit in the polymer block (a) or (b), an ethylene content, a conjugated diene monomer unit content, and an α-olefin content.

11. A rubber composition, comprising:
    the rubber block copolymer constituting the molded bale according to claim 1; and
    at least one selected from the group consisting of natural rubber, polyisoprene, polybutadiene, and ethylene-propylene-diene rubber.

12. A rubber composition, comprising:
the rubber block copolymer constituting the molded bale according to claim 1; and
a resin,
wherein the resin is contained in a content of 3 to 40 parts by mass based on 100 parts by mass of a rubber component.

13. A rubber composition, comprising:
the rubber block copolymer constituting the molded bale according to claim 1; and
silica,
wherein the silica is contained in a content of 20 parts by mass or more and 120 parts by mass or less based on 100 parts by mass of a rubber component.

14. A crosslinking rubber composition, comprising:
the rubber block copolymer constituting the molded bale according to claim 1; and
a crosslinking agent,
wherein the crosslinking agent is contained in a content of 0.1 parts by mass or more and 20 parts by mass or less based on 100 parts by mass of a rubber component.

15. A molded bale of the rubber composition according to claim 9.

16. A tread for a tire, comprising the rubber composition according to claim 9.

17. The molded bale of the rubber block copolymer according to claim 2,
wherein the content of the vinyl aromatic monomer unit in the polymer block (b) is less than 40% by mass.

18. The molded bale of the rubber-like block copolymer according to claim 2,
wherein an SP value ($MPa^{1/2}$) of the polymer block (a) is 16.4 or more and 18.5 or less.

19. The molded bale of the rubber-like block copolymer according to claim 3,
wherein an SP value ($MPa^{1/2}$) of the polymer block (a) is 16.4 or more and 18.5 or less.

20. The molded bale of the rubber-like block copolymer according to claim 17,
wherein an SP value ($MPa^{1/2}$) of the polymer block (a) is 16.4 or more and 18.5 or less.

* * * * *